United States Patent

Doyle et al.

[11] Patent Number: 5,155,822
[45] Date of Patent: Oct. 13, 1992

[54] HIGH PERFORMANCE GRAPHICS WORKSTATION

[75] Inventors: Peter L. Doyle, Northboro; John P. Ellenberger, Groton; Ellis O. Jones, Andover; David C. Carver, Medway; Steven D. DiPirro, Holliston; Branko J. Gerovac, Marlboro, all of Mass.; William P. Armstrong; Ellen S. Gibson, both of Salt Lake City, Utah; Raymond E. Shapiro, Marlboro, Mass.; Kevin C. Rutherford, West Valley City; William C. Roach, Salt Lake City, both of Utah

[73] Assignee: Digital Equipment Corporation, Maynard, Mass.

[21] Appl. No.: 85,081

[22] Filed: Aug. 13, 1987

[51] Int. Cl.$^5$ .............................................. G06F 12/00
[52] U.S. Cl. .................. 395/400; 364/DIG. 1; 364/246.3; 364/236; 364/236.3; 395/166
[58] Field of Search ............... 364/200 MS, 900 MS, 364/521

[56] References Cited

U.S. PATENT DOCUMENTS

| | | | |
|---|---|---|---|
| 4,453,211 | 6/1984 | Askinazi et al. | 364/200 |
| 4,742,447 | 5/1988 | Duvall et al. | 364/200 |
| 4,769,636 | 9/1988 | Iwami et al. | 340/799 |
| 4,777,589 | 10/1988 | Boettner et al. | 364/200 |
| 4,802,085 | 1/1989 | Levy et al. | 364/200 |
| 4,815,010 | 3/1989 | O'Donnell | 364/521 |
| 4,956,771 | 9/1990 | Neustaedter | 364/200 |

Primary Examiner—Stuart N. Hecker
Assistant Examiner—Rebecca L. Rudolph
Attorney, Agent, or Firm—Kenyon & Kenyon

[57] ABSTRACT

A stand-alone graphics workstation including a digital computer host and a graphics processing subsystem is disclosed. Address data relating to the graphics subsystem components is mapped into the host system virtual memory. The application processes residing in the host are thereby able to communicate directly with the graphics subsystem components, as, e.g. the structure memory, without the need of a direct memory access hardware arrangement or device drivers.

4 Claims, 14 Drawing Sheets

SUBSYSTEM ADDRESSES

| START | | SIZE |
|---|---|---|
| 2080 0000 | ACP RAM | 1 MB |
| 20C0 0000 | STRUCTURE MEMORY | 4 MB |
| 21F0 0000 | STRUCTURE MEMORY CSRS | |
| 21F4 0000 | STRUCTURE WALKER CSRS | |
| 21F8 0000 | RENDERING PROCESSOR CSRS | |

FIG. 7

CELL ARRAY

|     | PIX0  | PIX1  | PIX2  | PIX3  |
|-----|-------|-------|-------|-------|
| SL0 | 0,1   | 2,3   | 4,5   | 6,7   |
| SL1 | 8,9   | 10,11 | 12,13 | 14,16 |
| SL2 | 16,17 | 18,19 | 20,21 | 22,23 |
| SL3 | 24,25 | 26,27 | 28,29 | 30,31 |

FIG. 11

HIGH PERFORMANCE GRAPHICS WORKSTATION

BACKGROUND OF THE INVENTION

A. Field of the Invention

The invention relates to a computer graphics workstation and, more particularly, to a high performance, stand-alone graphics workstation including a digital computer host and a graphics processing subsystem. The invention provides efficient control structures to obtain a maximum utilization of system resources and to effectively coordinate operation among essentially data-driven, asynchronous components and thereby enable both two-dimensional and three-dimensional high resolution graphics displays.

B. Prior Graphics Systems

In recent years considerable advances have been made in the utilization of computer systems to generate and visually display character and graphical output data. The earliest systems were limited to two-dimensional displays very often realized through the use of alphanumeric characters. The graphics data generation capability of such early systems was limited and certain character representations of predetermined size and shape were stored in a character data memory and were transferrable to a display memory by the user, when desired, to expand the display capability of the system. A noteworthy advance in the computer graphics art involved the use of a so-called "bit mapped" graphics display system to store output data in a display memory. The "bit mapped" approach visualizes the output data as a two-dimensional array of pixels, where each pixel corresponds to an individual picture element in the display device. In a two-dimensional, black and white graphics display, each pixel need only contain one bit of information, i.e. either 0 or 1 to represent either black or white, respectively. Accordingly, all of the pixels for a two-dimensional, black and white display may be in the form of a two-dimensional map where the bits of information in the map comprise the output data representing the display device.

As should be understood, the graphic display of a three-dimensional object in color, as opposed to a two-dimensional object in black and white substantially increases the amount of output data required to represent the display device and the processing capability of the graphics system required to process the output data for display on a cathode ray tube. For instance, with respect to color alone, eight bits of information per pixel may be required to store information on the red, green and blue components of the color and the intensity of the color for display.

The bit mapped approach was expanded by the prior art to a planar concept wherein a three-dimensional array is visualized with separate spaced, parallel planes, each plane corresponding to one attribute of the color information, i.e., a red plane, a green plane, a blue plane and an intensity plane. Each pixel comprises bits stored on the separate planes and data processing requires the graphics system to retrieve the separate bits of a pixel from among several memory locations.

When other attributes and display characteristics such as a three-dimensional display, shading, surface reflective qualities, object rotation, etc. are to be added to the graphics system, the memory structure and capacity and data processing capability of the system must be greatly expanded to represent and visually display an object. Such capacity, structure and processing capability requirements have generally limited the feasibility of implementing a high performance, three-dimensional graphics system as a stand-alone, workstation-type system particularly a graphics system with a multi-user capability. While technological advances such as a 32 bit word microprocessor provide a hardware basis for a stand-alone, workstation implementation for a graphics system, there remain formidable data structure and processing and system operational control requirements to achieve an effective high performance graphics workstation system capable of processing multiple application processes to permit a multi-user implementation. These requirements have not been adequately addressed by the prior art.

SUMMARY OF THE INVENTION

Accordingly, it is a primary objective of the invention to provide a stand-alone, graphics workstation that accomplishes the data structure and processing and system operational control necessary for high performance, high resolution graphics display with a multi-user capability.

Generally, the system of the invention comprises a host central processing unit connected by means of an intermediate processing unit and a bus arrangement to a graphics subsystem. The host subsystem is operable to execute one or more application programs residing in the host to build graphics data structures representing two dimensional and/or three-dimensional objects to be displayed. The graphics data structures are stored in a structure memory component in the graphics subsystem. The three-dimensional graphics data structures are each implemented as a hierarchical graphics data node structure in the structure memory. For a thorough discussion of the principal concepts of interactive computer graphics as generally employed by the system of the invention, reference should be made to *Fundamentals of Interactive Computer Graphics* by J. D. Foley and A. Van Dam (Addison-Wesley 1982).

Each node is defined as a fundamental memory unit to contain graphics data or commands relating to the primitives, transformations, attributes and so on of the graphics structure being built pursuant to a specific application program residing in the host through the utilization of preselected structured graphics routines stored in a memory library, also in the host. An asynchronously operational structure walker in the graphics subsystem traverses a special control structure stored in the structure memory on a continuing basis to read and process requests for traversal of the nodes of the graphics structures and to send the data and command information contained in the nodes down a graphics pipeline for processing, manipulation and display by the graphics processing components of the graphics subsystem.

Pursuant to an important feature of the invention, a traversal control function is partitioned among the host and graphics subsystem components to accept requests for graphics structure traversals made by competing application programs, and to subsequently schedule and perform such traversals in a manner such that each of the competing graphics applications views the graphics processing subsystem as its own and is able to be executed with a most efficient utilization of the system components. The hierarchical node memory structure, asynchronous memory traversal and supervising traversal control functions together facilitate a high performance three-dimensional display capability within the system by providing an efficient allocation of system resources to store complex graphics data structures and to process the graphics data structures in an ordered and coordinated fashion. The system of the invention effectively utilizes efficient coordination and control of ongoing, data driven, asynchronous operation of the graphics subsystem components to place all of the system resources equally at the disposal of a multiple of application programs residing in the host to thereby enable a multi-user functionality.

In accordance with known concepts of interactive computer graphics, the invention makes use of a windowing system to provide a conversion from the world coordinate system of the user to appropriate geometric coordinates suitable for the physical display device of the workstation, i.e. the cathode ray tube. A window is a rectangular array of pixels which may be partially or wholly visible on the display device depending upon the size of the window relative to the physical dimensions of the display screen. Windows are also in a hierarchy with a "parent" window and sub-windows or "children". Windows may be resized and sub-windows used for clipping by the parent when a sub window is sized greater than the parent for detailed display of portions of a display device defined by a graphics structure. As will be described in more detail in the following description of a preferred embodiment of the invention, a highly advantageous windowing system for use in connection with the display of the graphic structures generated by the application programs is the X Window System developed under the auspices of the Massachusetts Institute of Technology as a royalty free industry standard. Pursuant to the invention, the data generated by the windowing system to create and define the window coordinates and attributes is uniquely identified by the traversal control system for correlation to the hierarchical graphics data node structure of the object to be displayed within the rectangular array of the window.

Accordingly, the asynchronous traversal by the structure walker is able to provide correlated graphics structure data and commands and window data to the graphics processing components. The window data-graphics structure correlation function of the traversal control further facilitates high performance three-dimensional graphics display by permitting the utilization of a highly effective window system such as the X Window System which was developed primarily for use in two dimensional, bit mapped graphics systems. The window identification data for correlation to the three-dimensional node memory structures systematically merges a three-dimensional functionality into the advantageous X Window System.

Pursuant to another significant feature of the invention, a separate two dimensional, bitmap graphics system is provided in parallel to the three dimensional components to process two dimension application programs. The bit map graphics system has resources suitable for two dimensional graphics including a bitmap memory and a rendering processor to traverse bitmap data commands in structure memory. Moreover, the structure memory is shared by the parallel three dimensional and two dimensional graphics systems to serve both as the three dimensional graphics structure memory and the two dimensional bit map memory. The rendering processor is also shared by the parallel graphics systems to process both bit map graphics and polygon rendering for three dimensional objects. In this manner, the system resources having three dimensional capabilities are not overburdened with processing tasks related to two dimensional displays and functional capabilities which overlap both the three dimensional and two dimensional processes are shared to reduce the number of hardware components in the system.

Further operating efficiency is achieved by mapping address data relating to the graphics subsystem components into the host system virtual memory. The application processes residing in the host are thereby able to communicate directly with the graphics subsystem components, as, e.g. the structure memory, without the need of a direct memory access hardware arrangement or device drivers.

Accordingly, the present invention achieves a high performance, three dimensional graphics capability feasible in a stand-alone workstation configuration by maximizing the processing capabilities of interactive components. Hierarchical data structures are built in memory to permit the definition of complex data structures representative of the primitives, attributes and geometric transformations of three dimensional objects. The asynchronous traversal of the data structures built in the memory together with the traversal control functions coordinate and control the flow of graphics data and commands to a graphics pipeline for ordered processing and display in a manner that readily permits efficient processing and display of a multiple of application processes.

For a better understanding of the above and other features and advantages of the invention, reference should be made to the following detailed description of a preferred embodiment of the invention and to the accompanying drawings.

BRIEF DESCRIPTION OF THE DRAWINGS

FIG. 7 is an exploded view block diagram of the reserved I/O space of the block diagram of FIG. 6.

FIG. 11 is a block diagram of the bitmap cell array.

DETAILED DESCRIPTION OF A PREFERRED EMBODIMENT OF THE INVENTION

System Overview

Figure 1:
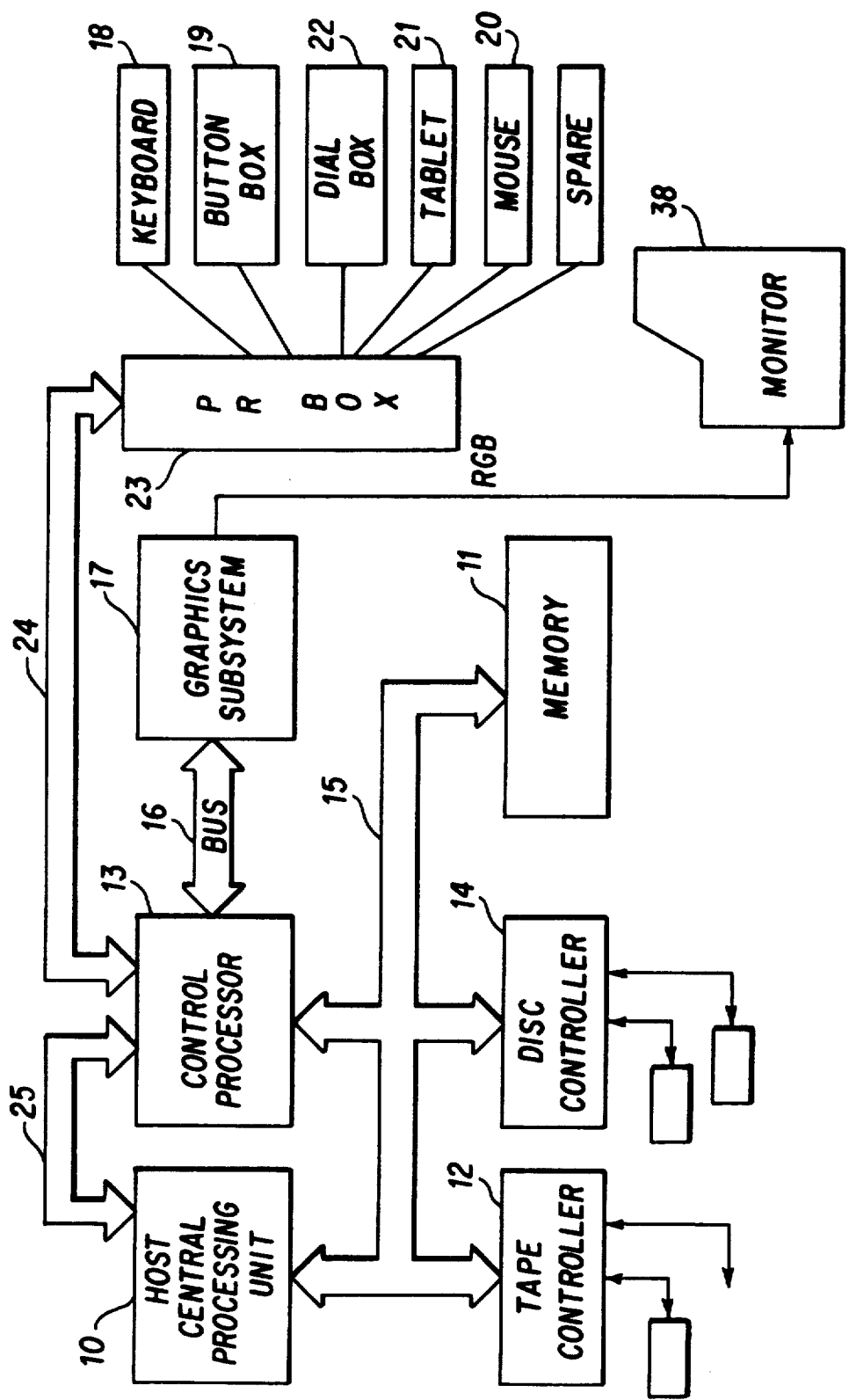
FIG. 1 is a block diagram of a computer graphics system in accordance with the present invention.

Referring now to the drawings and initially to FIG. 1, there is illustrated, in block diagram form, the graphics workstation system according to the invention. A first or host subsystem includes a host central processing unit 10, a host memory 11, a tape controller 12, a control processor 13 and a disk controller 14. The host subsystem components 10, 11, 12, 13 are interfaced with one another by means of a primary bus 15.

A preferred host subsystem for advantageous implementation of the teachings of the invention comprises a Scorpio or Digital KA825 host processor utilized as the host central processing unit 10, a 4-Mbyte MS820-BA memory module as the host memory 11, a DEBNx Ethernet local area network and TK50 95 Mbyte streaming tape drive as the tape controller 12, an RD54 150-Mbyte nonremovable-disk drive and an RX50 818-kbyte diskette drive as the disk controller 14, an Aurora or Digital KA800 control processor to function as the control processor 13 and a VAX Bus Interconnect or VAX BI synchronous, time-multiplexed, 32-bit primary bus as the bus 15. The Scorpio processor is a single board VAX processor which executes the complete VAX instruction set and runs either the VMS or ULTRIX operating system and applications. The Scorpio host processor, Aurora control processor, VAX BI bus and other host subsystem components are marketed by the Digital Equipment Corporation.

The control processor 13 is provided with a local or II 32 bus 16 to interface the control processor 13 with a graphics subsystem 17. The Aurora control processor 13 therefore acts as an interface between the graphics subsystem 17 and the BI bus (primary bus) 15. The control processor 13 also performs input and output pre-processing for interactive perphireal devices such as a keyboard 18, a button box 19, a mouse 20, a tablet 21 and a dial box 22 which are connected to the control processor 13 by means of a peripheral repeater box 23 through a serial data line 24, as illustrated in FIG. 1. The peripheral repeater box 23 is utilized to power the peripheral devices 18, 19, 20, 21, 22 at the monitor site and to collect peripheral signals from the peripheral devices 18, 19, 20, 21, 22. The peripheral repeater box organizes the collected peripheral signals by packetizing the signals and sending the packets to the host central processing unit 10 via the control processor 13. The peripheral repeater box 23 also receives packets from the host processing unit 10 via the control processor 13, unpacks the data and channels the unpacked data to the appropriate peripheral device 18, 19, 20, 21, 22. For a more detailed description of the input and output pre-processing functions of the control processor 13 and the peripheral repeator box 23, reference should be made to co-pending application Ser. No. 07/085,097, now U.S. Pat. No. 4,905,232, entitled Peripheral Repeater Box, filed on even date herewith.

Moreover, the Aurora control processor 13 is advantageously operable to emulate a console for the Scorpio host central processing unit 10. The console emulation is accomplished through the use of a serial data line 25 between the control processor 13 and the host central processing unit 10. The Aurora control processor 13 may therefore be used to run diagnostics and to debug the host subsystem without the need of additional equipment. For a more detailed description of the console emulation function of the control processor 13, reference should be made to copending application Ser. No. 07/084,930, now U.S. Pat. No. 4,903,218 entitle Console Emulation for Graphics Workstation, filed on even date herewith.

Figure 2:
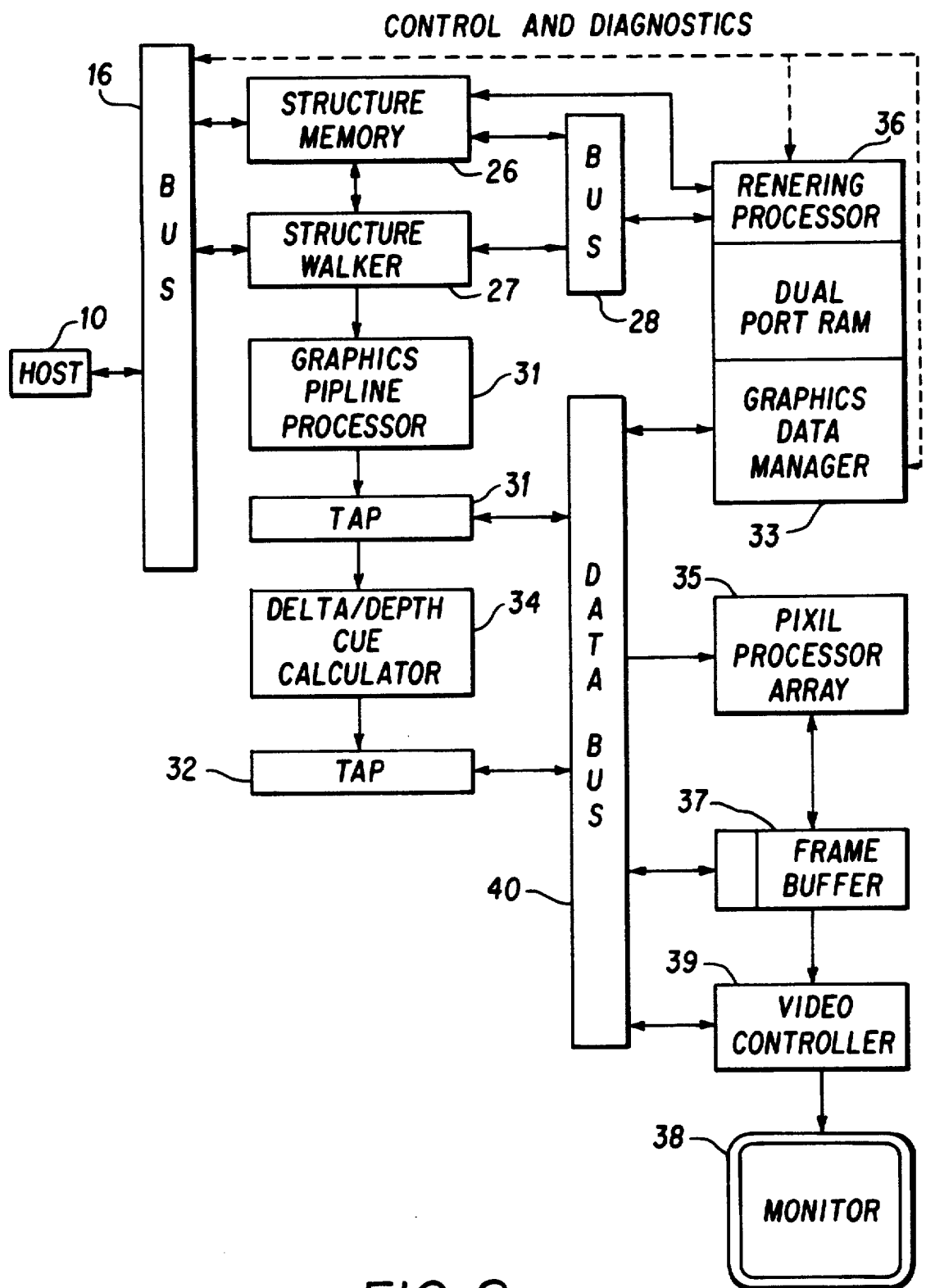
FIG. 2 is a block diagram of the graphics subsystem of FIG. 1.

Pursuant to the preferred embodiment of the invention, the graphics subsystem 17 comprise a Shadowfox graphics card set marketed by the Evans & Sutherland Computer Corporation. The primary function of the graphics subsystem 17 is to store graphics data structures built by a plurality of application programs residing in the central processing unit 10 and to process, manipulate and display the graphics data structures, as will appear. Referring to FIG. 2, the Shadowfax graphics card set includes a structure memory 26 interfaced with the control processor 13 by the local II 32 bus 16. As will be described in more detail below, the structure memory 26 comprises a 4-Mbyte memory to store the graphics data structures built by application programs in the host central processing unit 10.

An asynchronously operational structure walker 27 is interfaced with the control processor 13 by the II32 bus 16 and with the structure memory 26 by a structure memory bus 28. The structure walker 27 is a special-purpose, 32 bit, bit-slice microprocessor that traverses the graphics data structures stored in the structure memory 26 on a continuous basis and sends the graphics data to the graphics pipeline processor 29 through line 30.

In accordance with the design and mode of operation of the Shadowfax graphics subsystem, the graphics pipeline processor 29 organizes the data received from the structure walker 27 into packets and performs graphics transformations, matrix multiplication, clipping, perspective division and viewport mapping. Accordingly, the graphics data structures, as processed by the graphics pipeline processor 29, are transformed from the data structure world space data as implemented by a user through an application program in the host central processing unit 10 into displayable screen space data relative to the physical dimensions of the screen upon which the object is to be displayed.

A pair of data taps 31,32 examines each command and data packet received from the output of the graphics pipeline processor 29 to determine whether to send the packets further down the pipeline or to send the packets into a graphics data manager 33, which forwards the packets to the appropriate destinations. For example, X, Y, Z and color data packets are sent directly to a delta/depth cue calculator 34 for calculation of line slope, adjusted end points and status flags which describe the orientation of a line. Color data and Z data are mixed with background colors to determine relative red, green and blue values. The delta/depth cue calculator output is sent to a pixel processor 35 for calculations in line drawing algorithms. The graphics data manager 33 is used to load all valid draw commands for loading into the pixel processor 35 and further operates to buffer pipeline commands to a rendering processor 36 and to buffer data from the rendering processor 36 to the pixel processor 35. As will be described in more detail below, the rendering processor 36 is used in the three-dimensional graphics process to render polygons.

The pixel processor 35 comprises sixteen identical processors which draw antialiased and depth-cued lines using the endpoint and slope data produced by the delta/depth cue calculator 34 as well as the polygon rendering data provided by the rendering processor 36. The data from the pixel processor 35 is sent to a frame buffer 37 which comprises a 1024×1024 pixel memory to contain the pixel image generated for the system monitor 38. The frame buffer 37 provides a 1024×864, 60 hz noninterlaced, raster-scan display format.

A video controller 39 receives the output from the frame buffer 37 and converts the digital data to an analog signal to drive the monitor 38. In the preferred embodiment, the monitor 38 comprises a Digital VR290-DA/D3/D4 nineteen inch color monitor having a 1024×864 pixel image area. The video controller 30 also contains a window look up table to determine the video format for the display and a color look up table of color values to define the red, green and blue components of the pixels. A graphics data bus 40 is provided to interface the video controller 30 and the various other components of the graphics subsystem 17, as illustrated in FIG. 2.

Subsystem Mapping

Subsystem mapping refers to a technique utilized in the present invention to allow the host processor 10 to directly access local RAM in the control processor 13, structure memory 26 and various registers in the graphics subsystem 17. These components are directly mapped into host system virtual memory. Subsystem mapping is highly advantageous in the operation of the system of the present invention, which is a "data-driven" machine, as will appear.

In a conventional system, the method that is used to access hardware external to a CPU is through the use of a device driver. A device driver is a program which is specifically tailored to handle communications between a host CPU and a specific device, i.e., memory, disk unit, tape unit, etc. Thus, when the CPU wishes to access external device memory, it invokes a device driver which either loads device memory directly through the use of registers or sets up a direct memory access (DMA) operation. For DMA, the driver locks down the user's data into physical memory (DMA hardware requires that the data be locked into physical memory), sets up source and destination addresses, and then invokes DMA hardware to get the information transferred from source to destination.

Generally, this DMA approach is very acceptable. However, in a data-driven machine such as the present invention, the cost of such approach would be prohibitive. In the present graphics system, the host central processing unit's main function is to send commands to the graphics subsystem 17. This would require the host central processing unit 10 to utilize DMA hardware for almost every operation it performed. Thus, it was with this problem in mind that subsystem mapping scheme was devised.

The host central processing unit 10 shares the BI bus 15 with system memory 11 and the control processor 13 (See FIG. 1). The control processor's local bus is the II32 local bus 16. On bus 16 are the local control processor RAM (1 Mbyte), local registers, and components of the graphics subsystem 17 including structure memory 26, structure walker 27, graphics pipeline 29, graphics data manager 33 and rendering processor 36, pixel processors 35 and the frame buffer 37. Note that not all the above components are physically connected to the II32 bus (See FIG. 2). The subsystem mapping scheme permits the host central processing unit 10 to directly access II32 bus components.

Figure 6:
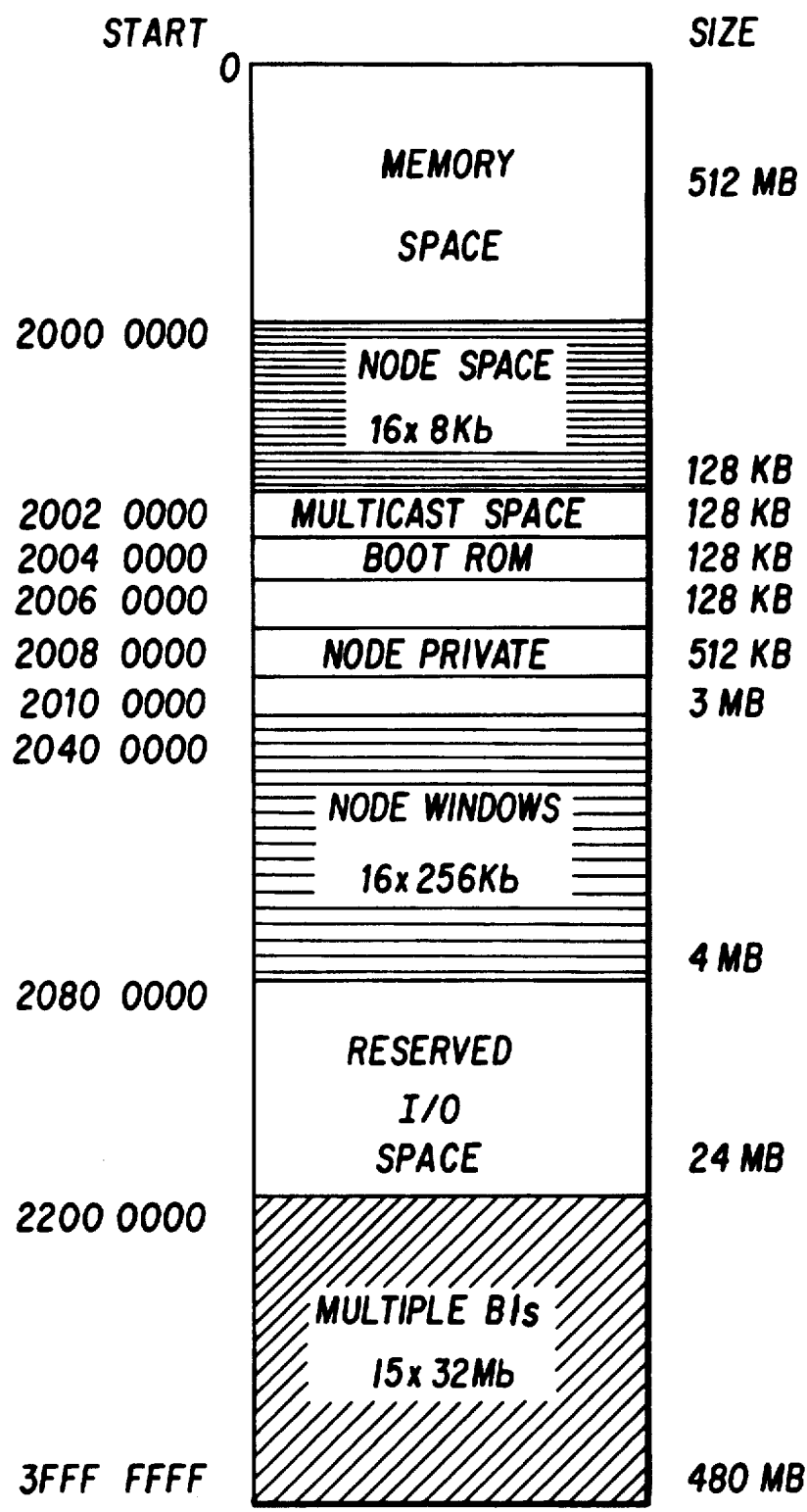
FIG. 6 is a block diagram of the BI bus memory map of the invention.

To accomplish the direct access, the II32 bus 16 components are mapped into the reserved I/O space of the BI bus (primary bus) memory map. FIG. 6 illustrates the BI memory map and FIG. 7 sets forth the details of the reserved I/O space of the memory map of FIG. 6 where the components are mapped. Upon system initialization, a device driver of the host central processing unit 10 is invoked to perform the mapping. The first step it performs is to set up two mapping registers in the control processor 13. The mapping registers themselves are mapped into the host virtual address space by the operating system. The first register, SADR, reflects the starting address of the reserved I/O space in the BI memory map which is 20800000 HEX. The second register, EADR, reflects the ending address of the reserved I/O space in the BI memory map which is 22000000 HEX. This is accomplished by the device driver simply writing the start and end address into the respective registers. The control processor 13 microcode relocates its own local RAM to be within this address range. Once this step is performed the physical mapping has been accomplished.

The next step that the host device driver performs is to map each II32 component (control processor RAM, structure memory 26 and graphics subsystem 17 registers) into the host's system virtual address space (S$\phi$). This step is required because host software is incapable of specifying physical addresses due to the inclusion of memory management (MM) hardware on the host central processing unit 10. This hardware is always running and screening addresses output by the host central processing unit 10. Each address is assumed to be a virtual address, therefore, the memory management hardware will always try to perform a level of translation with that address to create a physical address. The level of translation depends on whether the address is a system virtual address or a process virtual address. This distinction is important because each goes through a different translation table and translation mechanism. Process virtual addresses are process specific and, if used for purpose of present invention, every process would have to map to the memory itself. This would give every process 4 MBytes of virtual address space added to its own address space. Thus, in accordance with the present invention, by selecting the II32 bus mapping to be system virtual addresses, every process on the system can have access to this bus without wasting memory resources. This also reduces the complexity of computations used to determine physical addresses referenced by the graphics subsystem.

The last step that the host device driver performs is to unprotect S$\phi$ pages that contain the II32 bus component's virtual addresses. By unlocking these pages, any process on the system can access this system virtual address space. Generally, S$\phi$ pages contain operating system software and data that not every process can access. If an S$\phi$ page is locked, the only way to access these virtual addresses is through the use of system calls. This would add more complexity to the system and increase the overhead. Thus by unlocking the S$\phi$ pages, the use of system calls are eliminated.

After the host device driver has performed the steps described above, the mapping is complete. Now each process has direct read/write access to any of the mapped II32 bus components because these components are directly mapped into the host's virtual memory. Each process can treat these components as its own local memory. Therefore, the need for the use of direct memory access hardware, device drivers or operating system calls is eliminated.

Memory and Software Organization

From the above description, it should be understood that the graphics subsystem 17 operates essentially in an asynchronous mode determined by the asynchronous operation of the structure walker 27 which, as described above, controls the flow of data from the structure memory 26 to the other components of the graphic subsystem 17 through the continuous, sequential traversal of the graphics data structures. The entire data flow through the graphics pipeline is a function of the structure walker operation. As will be described in more detail below, the host central processing unit 10 executes application programs to build graphics data structures in hierarchical node structures representative of the three dimensional objects to be displayed The node structures are stored in the structure memory 26.

Conditional Nodes of a Graphics Data Structure

A graphics data structure consists of all the data which describes an object and how it is displayed. A graphics data structure is a hierarchical collection of nodes and the paths that connect them.

A node is a set of executable commands and data. The structure walker 27 traverses each node in order, following one or more pointers in each node which link the node to the rest of the data structure. As it traverses the node, the structure walker 27 extracts the commands and data and sends them down the graphics pipeline, where they eventually result in the display of the object defined by the data structure.

Figure 13:
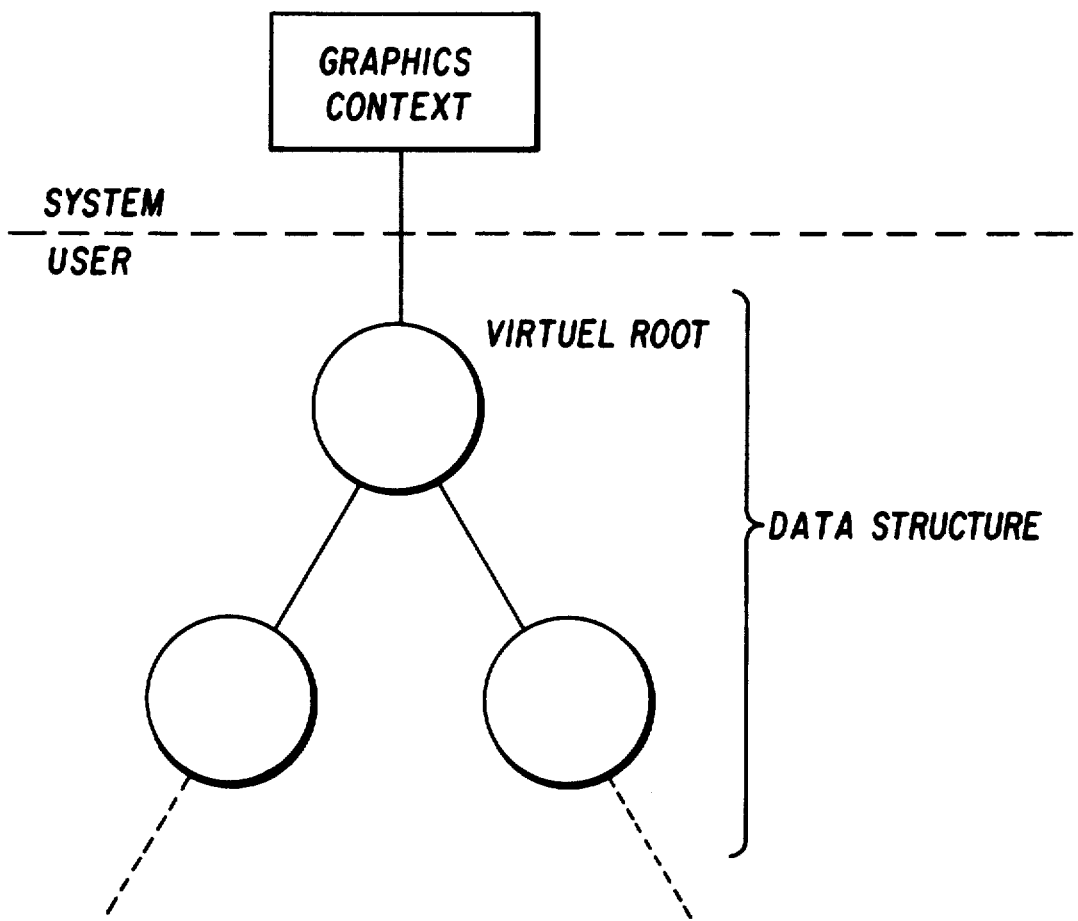
FIG. 13 illustrates, in block diagram form, the connection between a graphics context and the virtual root node of a data structure.

The data structure exists in a graphics environment defined by a graphics context which will be described in more detail below. The graphics context is connected to the system data structure through a virtual root node. A virtual root node is simply the top-most node created by the user stemming from the graphics context that was created by the system as shown in FIG. 13.

While building a data structure, the nodes that form the data structure offer a wide range of functions i.e. from describing graphics primitives to controlling traversal flow. Nodes are linked together in groups or structures, by first calling the structure graphics routine (SGR):

SGR$BEGIN_STRUCTURE (context);

and then calling the routines that create the node, and ending the sequence with the routine SGR$END_STRUCTURE (context, handle). The result is that the pointers link the nodes together thus permitting the structure walker 27 to traverse the nodes in their correct order as described below.

There are six node classifications for creating data structures. The first three being:

Primitive nodes—Contain graphics data for vectors, polygons and strings.

Attribute nodes—Control the appearance of graphics primitives such as line color, line pattern, shading and lighting Transformation nodes—Describe how data is viewed on the screen. Transformation nodes control the composition of matrices for graphics transformation and normal transformation, and for the viewport. For example, if a primitive node builds a cube, a transformation node can scale and rotate it to make a brick.

The next three nodes are used to create advanced graphics data structures.

REFERENCE NODES

Hierarchical structures are built with reference nodes. A reference node instructs the structure walker 27 to traverse another structure (referred to as a "substructure" of the calling structure) before continuing with the traversal of the structure containing the reference node. Reference nodes operate in three modes: restore, no restore and branch. The ref_mode parameter of the routine that creates the node defines the mode. These modes control the manner in which changes to the hierarchical graphics state affect the traversal of other parts of the graphics data structure.

Restore Mode

A reference node set to restore mode instructs the structure walker 27 to save the current graphics state such as the current transformation matrix, current attribute settings, etc. on a stack before traversing the referenced substructure, then to restore that state when it has finished traversing the substructure. As a result, changes in the hierarchical graphics state made in a substructure do not affect the graphics state of higher structures.

No-Restore Mode

A reference node set to no-restore mode redirects the structure walker 27 but does not instruct the structure walker to save the hierarchical graphics-state and restore it upon returning to the reference node. This mode is useful in at leaset two situations: When you are sure that a referenced substructure will not change the graphics state and you want to optimize traversal performance, and when you want changes in graphics state at a lower hierarchical level to affect the traversal of an equal or higher level of the data structure.

Branch Mode

As with the restore and no-restore modes, a reference node set to branch mode redirects the structure walker traversal. However, when the structure walker 27 finishes traversing the referenced substructure, it does not return to the reference node; as a result, there is no need to save or restore the graphics state. Branch reference mode is usually used with conditional reference nodes which select among two or more substructures. It is similar to the "GOTO" statement in a programming language.

Figure 14A:
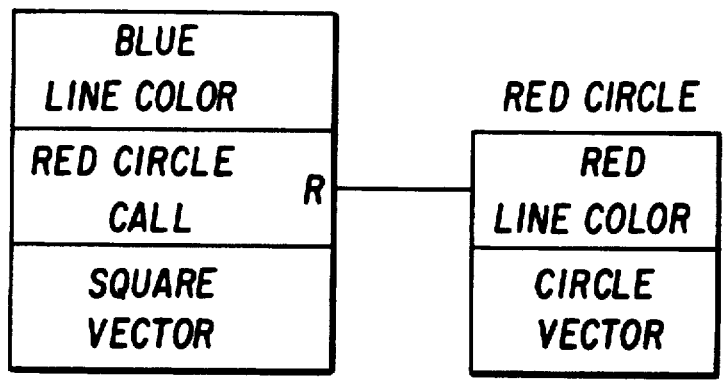
FIGS. 14a,b,c illustrate examples of various reference nodes.
Figure 14B:
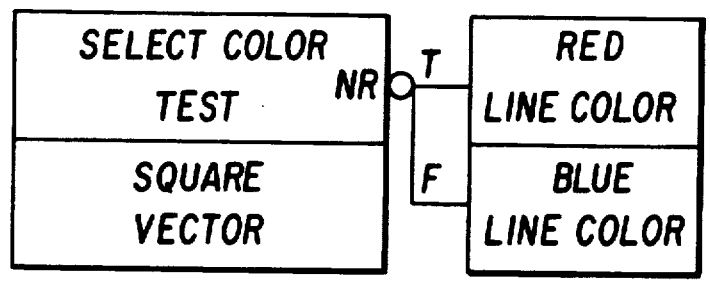
Figure 14C:
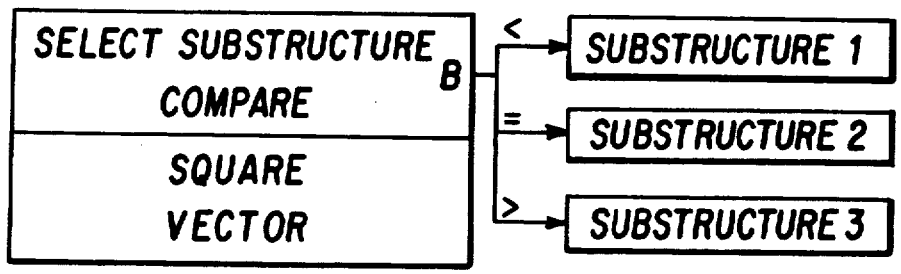

Reference nodes are of two types: conditional and unconditional. Both node types can perform restore, no-restore, and branch references. Conditional nodes select one among two or more alternate traversal paths depending on the value of one or two operands. For example, one type of conditional node compares whether operands are equal to, greater than, or less than each other. Unconditional nodes reference a single substructure with the option of returning to the higher-level structure when the structure walker 27 finishes traversing the referenced structure. FIGS. 14a–c give examples of various kinds of references. Note that an "R", "NR", or "B" in the right side of a reference node in FIGS. 14a–c indicates whether the reference is of the restore, no-restore, or branch variety; in addition, a circle is placed on the main reference pointer for no restore references as an additional visual clue, and nodes following a branch reference are shaded gray to show that the structure walker 27 never traverses these nodes.

FIG. 14a shows a data structure featuring a Call/Restore node which displays a red circle with a blue square. Because the reference node restores state, the red line-color attribute does not affect the line-color attribute set in the calling structure.

FIG. 14b shows a data structure featuring a conditional Test/No Restore node which displays either a blue or a red square, depending upon whether the operand tested by the Test/No Restore node is true or false. Because the reference node does not restore state, the line-color attribute set in the referenced structure does affect the color displayed by the calling structure.

FIG. 14c shows a data structure featuring a conditional Compare/Branch node which will display one of the three referenced substructures, depending on the values of the operands compared by the Compare/Branch node. Note that diagrams of substructures that cannot fit on the page are represented by labeled frames.

Assignment Nodes

The assignment nodes set up and manipulate the values (operands) that are tested by conditional reference nodes, permitting dynamic control of how a given conditional reference node selects the path of traversal. The nodes perform operations on data contained in structure memory locations. The operations include move, logical OR (set bits), logical AND NOT (clear bits) add, subtract, logical XOR.

Special Purpose Nodes

The special purpose nodes allow you to build custom nodes, use the same data at different places in the structure, and store unused data. This saves both structure memory space and editing time. Three special purpose nodes are provided; a data node, a generic node, and an indirect node. These nodes can provide increased flexibility by allowing the application to tailor a data structure for its own needs.

Data nodes are provided to contain application data in fields which are reserved for the application. The structure walker ignores data in the data node, and follows the next pointer.

The generic node contains commands and data that go to the pipeline. The structure walker 27 does not process information in a generic node, but passes this node to the graphics subsystem 27 without recording changes in the subsystem state. Generic nodes can change the state of the graphics subsystem, but the structure walker does not restore changes made this way.

The indirect node provides the ability to reference data in one node from another node in the data structure. For example, an application can define a node containing line color data and use indirect nodes to reference the information in the indirect node. This saves memory and allows changes to the color definitions without editing many nodes throughout the structure. Any primitive, attribute, and transformation operations can be done using indirect nodes.

Advanced graphic data structures are created by the routines shown in Table 1.

TABLE 1

Advanced Graphic Data Structure Routines

| SGR | | Parameter |
|---|---|---|
| 1. | SGRSBEGIN_STRUCTURE | context |
| 2. | SGRSEND_STRUCTURE | context, handle |
| 3. | SGRSCALL | context, reference_mode, reference_handle, handle |
| 4. | SGRSTEST | context, reference_mode, mode, opspec, true_handle, false handle, handle |
| 5. | SGRSTEST_AND_CLEAR | context, reference_mode, mode, opspec, true_handle, false handle, handle |
| 6. | SGRSCOMPARE | context, reference_mode, mode1, mode2, opspec2, less_handle, equal_handle, greater_handle, handle |
| 7. | SGRSCASE | context, reference_mode, mode, opspec, count, otherwise handle, case_handles, handle |
| 8. | SGRSTEST_SET | context, reference_mode, mode1, opspec1, mode2, opspec2, true handle, false_handle, handle |
| 9. | SGRSTEST_CLEAR | context, reference_mode, mode1, opspec1, mode2 opspec2, true HANDLE, FALSE_handle, handle |
| 10. | SGRSMOVE | context, mode1, opspec1, mode2, opspec2, handle |
| 11. | SGRSMOVE_BLOCK | context, size, mode1, opspec1, mode2, opspec2, handle |
| 12. | SGRSMOVE_MASK | context, mask, mode1, opspec1, mode2, opspec2, handle |
| 13. | SGRSSET_BITS | context, mode1, opspec1, mode2, opspec2, handle |
| 14. | SGRSCLEAR_BITS | context, mode1, opspec1, mode2, opspec2, handle |
| 15. | SGRSADD | context, mode1, cpspec1, mode2, opspec2, handle |
| 16. | SGRSSUB | context, mode1, cpspec1, mode2, opspec2, handle |
| 17. | SGRSXOR | context, mode1, opspec1, mode2, opspec2, handle |
| 18. | SGRSGENERIC | context, size, data, handle |
| 19. | SGRSINDIRECT | context, to_handle, handle |
| 20. | SGRSINDIRECT | context, to_handle, handle |

TABLE 1-continued

Advanced Graphic Data Structure Routines

| SGR Parameter | |
|---|---|
| 21. SGR$DATA | context, size, data, handle |

The use of conditional nodes provide the user with greater flexibility in the creation of advanced data structures. Referring to Table 2 above, conditional nodes are created by calling routines 4–9 assignment nodes by the routines 10-17 and special purpose nodes by the routines 18-21.

Conditional Reference Nodes

Conditional reference nodes redirect the traversal path of the structure walker 27 based upon either a true/false test or a value comparison. Based on the outcome of the test, the conditional reference node instructs the structure walker 27 to follow a predetermined traversal path associated with the test result.

The test performed by the conditional reference nodes use values stored in one or two operands (depending on the node type) in the node. The value of these operands are set by the manipulations of the assignment nodes thus permitting dynamic control of how a given conditional reference node selects the path of traversal. These operands are retrieved by use of the four access modes described in Table 2 and are the subject of the present invention.

The access modes are specified by constants set in the mode, mode1 or mode2 parameters (depending on the node type) of the routine that creates the node. The access modes tell the system how to interpret the operational specifier (opspec) parameter argument of the routine. The mode1 parameter specifies the access of opspec1, and mode2 specifies the access of opspec2.

TABLE 2

| Operand Access Modes | |
|---|---|
| Constant | Mode Description |
| SGR$K_IMMEDIATE | The operand is the current value stored as the operand specifier (opspec) a command parameter in the node. |
| SGR$K_ABSOLUTE | The operand is contained in the structure memory virtual address stored as the operand specifier in the node. |
| SGR$K_REGISTER | The operand is contained in one of three registers numbered (0-2). These registers are special locations in structure memory which can be saved and restored as part of the hierarchical graphics state. All three registers can be used to store an operand, but register 0 must be reserved for use as a base-address register when displacement mode is used. |
| SGR$K_DISPLACEMENT | The operand is located in the structure memory virtual address obtained by adding the value stored in the operand specifier to the contents of register 0. |

The test performed by the conditional reference node uses the value of the operand at the time of traversal; this may be the operand passed to the node-building routine when it was called, or an assignment node may have changed the value of the operand as detailed below.

The Operand access modes are important in the use of assignment and reference nodes. By use of the access modes, assignment nodes can create additional data or general data in the structure memory. The reference nodes can then be made to branch according to the data created. The use of special purpose nodes allows the data to be sent to the graphics subsystem 17. In this way, the data structure can in effect write a "subprogram" and execute it during the traversal of the structure. This provides for a more general functionality as well as a more efficient use of memory resources than present methods whereby conditional branching takes place on a fixed location such as a condition register.

Examples of conditional reference and assignment nodes are as follows:
°TEST
°TEST_AND_CLEAR
°COMPARE
°CASE
°TEST_SET
°TEST_CLEAR The test node is created by the routine:
SGR$TEST (context, reference_mode, mode, opspec, true handle, false_handle, handle)

This node performs a simple true/false test on an operand and directs the structure walker to traverse one of two substructures depending on whether the results of the test is true (nonzero) or false (zero). The value of the operand remains unchanged.

The test_and_clear Node is created by the routine:
SGR$TEST_AND CLEAR (context, reference_mode, mode, opspec, true_handle, false_handle, handle)

This node performs a true/false test similar to the test node. It first tests the value of an operand, then sets the value of the operand to zero (false). Because it clears the operand (that is, sets it to a false condition), on subsequent traversal this node would direct the structure walker 27 down the path associated with a true condition only if the operand were reset to true once again.

The compare node is created by routine:
SGR$COMPARE (context, reference_mode, mode1, opspec1, mode2, opspec2, less_handle, equal_handle, greater handle, handle)

This node performs a test on two operands to determine which, if either, is greater, and directs the structure walker to traverse one of three substructures, depending on whether the first operand is less than, equal to, or greater than the second operand. The operands remain unchanged.

The case node is created by the routine:
SGR$CASE (context, reference_mode, mode, opspec, count, otherwise_handle, case_handles, handle)

This node tests the value of an operand and directs the structure walker to traverse a substructure assigned to that value; if the value of the operand is not associated with substruture, then a defalt substruture is traversed. The operand remains unchanged. This node allows the selection of a number of traversal paths, depending on the value of the operand in the node.

The test_set and test_clear Nodes are created with the routines:
SGR$TEST_SET (context, reference_mode, mode1, ops.pec1, mode2, opspec2, true_handle, false_handle, handle)
SGR$TEST_CLEAR (context, reference_mode, mode1, opspec1, mode2, opspec2, true_handle, false_handle, handle)

These nodes allow the performance of mask-like tests to determine which parts of the graphics data structure will be traversed. The test_set determines if the bits which are set in the first operand are also set in the second operand. If the test result is true (that is, if the logical AND of the two operands is equal to the first operand), then the first substructure is traversed; if false, the second substructure is traversed.

The test_clear determines if the bits which are clear in the first operand are also clear in the second operand. If the test result is true (that is, if the logical AND of the two operands is equal to 0), then the first substructure is traversed; if false, the second structure is traversed.

For instance, a mask could be store in register 1 which represents whether certain features are "enabled" or "disabled." A test_set node could be used to test whether a feature was enabled and, if so, direct the structure walker to traverse the appropriate substructure.

Assignment Nodes

Assignment nodes provide additional flexibility in the use of conditional reference nodes by modifying their operands as a result of data structure traversal. In other words, the condition to be tested by the conditional reference nodes can be different at each traversal, depending on how assignment nodes are used to modify their operands.

Assignment nodes perform arithmetic or bit operations on the operands used by conditional reference nodes. The following are assignment nodes:
°MOVE
°MOVE_BLOCK
°MOVE_MASK
°SET_BITS
°CLEAR_BITS
°ADD
°SUB
°XOR The move node is created by the routine:
SGR$MOVE (context, mode1, opspec1, mode2, opspec2 handle)

This node performs a longword move operation, from the location described by opspec1 to the location described by opspec2.

The move_block node is created with the routine:
SGR$MOVE_BLOCK (context, size, mode1, opspec1, mode2, opspec2, handle)

This node performs a move operation on a block of longwords indicated by the size parameter, from the location described by opspec1 to the location described by opspec2.

The move_mask node is created with the routine:
SGR$MOVE_MASK (context, mask, mode2, opspec2, handle)

The node sets the bits specified by the mask parameter to the same values in the second operand as their corresponding values in the first operand.

The set_bits node is created with the routine:
SGR$SET_BITS (context, mode1, opspec1, mode2, opspec2, handle)

This node performs a logical OR operation, setting all the bits in the second operand which are set in the first.

The clear_bits node is created with the routine:
SGR$CLEAR_BITS (context, mode1, opspec1, mode2 opspec2, handle)

This node performs a logical AND NOT operation, clearing all the bits in the second operand which are set in the first.

The add node is created with the routine:
SGR$ADD (context, mode1, opspec1, mode2, opspec2, handle)

This node performs a signed longword addition of operand 1 and operand 2. The result of the addition is stored in the second operand.

The sub node is created with the routine:
SGR$SUB (context, mode1, opspec1, mode2, opspec2, handle)

This node performs a signed longword subtraction, subtracting operand 1 from operand 2 and storing the result in the second operand.

The xor node is created with the routine:
SGR$XOR (context, mode1, opspec1, mode2, opspec2, handle)

This node performs a logical XOR operation using the two operands and storing the result in the second operand. Note that if all the bits in the second operand are set, a logical NOT is performed.

Examples of special purpose nodes are given below.

The routines that build special-purpose nodes increase the flexibility and efficiency of the graphics data structure. There are three nodes as follows:
°Generic
°Indirect
°Data The generic node is created by the routine:
SGR$GENERIC (context, size, data, handle)

The generic node provides the means of sending commands or data, or both, through the graphics pipeline; in effect, creating a custom node. The commands that are used should not affect the hierarchical graphics state.

The indirect Node is created by the routine:
SGR$INDIRECT (context, to_handle, handle)

The indirect node references data in another node. An application may insert indirect nodes that reference predefined data. The routine inserts the node type of the referenced node into the indirect node being created, as well as a pointer directing the structure walker to traverse the data contained in that node. This creates a node identical to the referenced node, but located in a different part of the graphics data structure. This routine is useful in building attribute tables. This saves memory, and limits the number of changes when editing.

The data Node is built by the routine:
SGR$DATA (context, size, data, handle)

The data node is used for storage, or to hold data to be used by the application program. During structure traversal, the structure walker 27 passes over data in this node, but follows the next pointer.

The primary function of the structure walker 27 is to accurately traverse the nodes of the data structures in the proper sequential order and to process each node type correctly. The processing function of the structure walker 27 involves execution of node commands relating to further traversal of the nodes of the structure or conditional branching to alternative node branches in the node structure and the sending of the data and command information contained in the traversed nodes to the graphics piplne processor 29 for processing, as described above.

Software Organization

Figure 3:
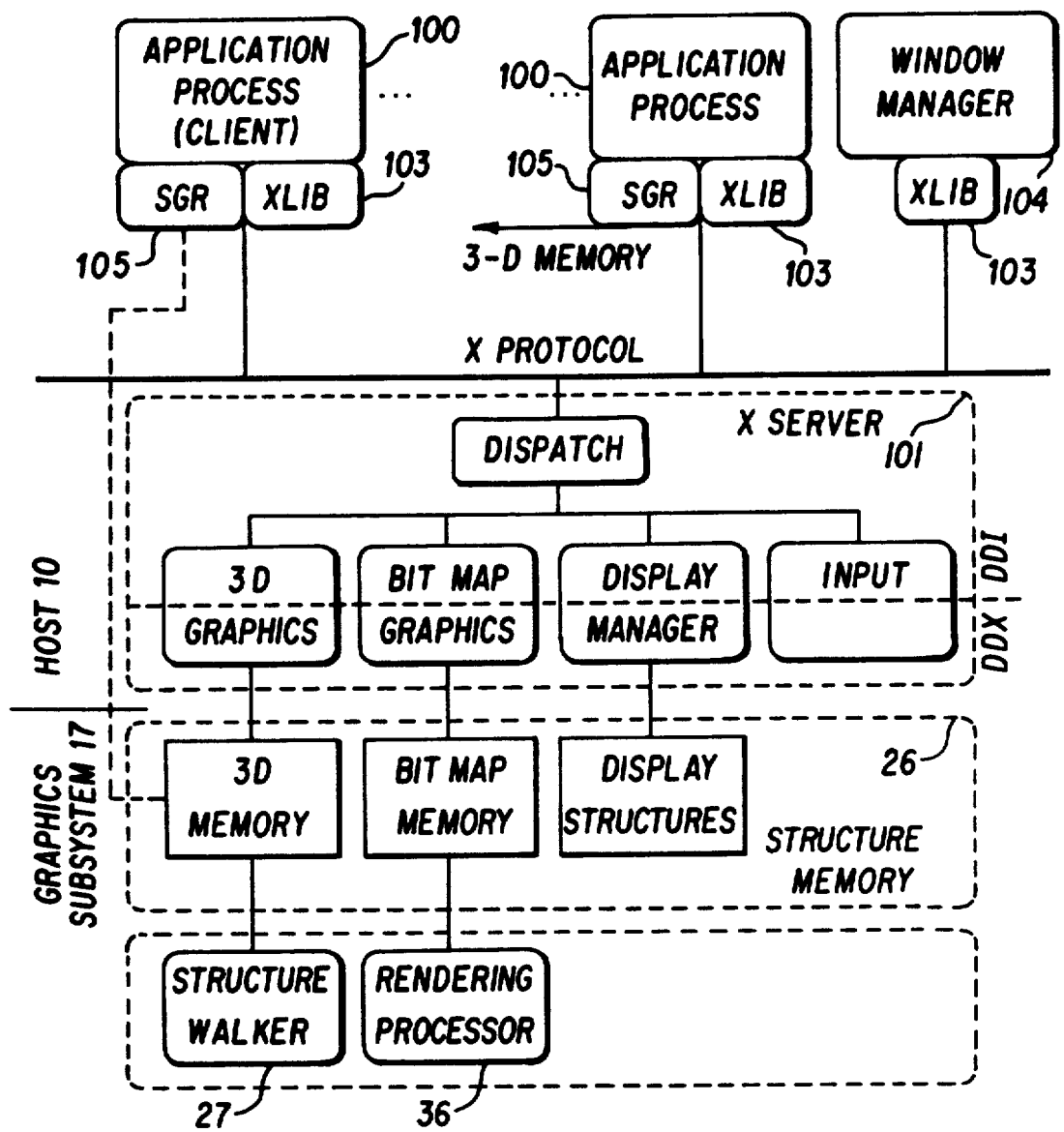
FIG. 3 is a block diagram of the software organization for the computer graphics system of the present invention.

Referring now to FIG. 3, there is illustrated a block diagram of the software organization of the graphics system of the invention. An application 100 contains requests relating to the building of graphics data structures. Many applications 100 are present in the host central processing unit 10 to build multiple graphics data structures for manipulation and display by the graphic subsystem 17. In the preferred embodiment, the X Window System is implemented to perform the windowing and bit map graphics requests contained in the application program 100. The X window system is fully described in publications published by the Massachusetts Institute of Technology such as *Xlib - C Language X Interface Protocol Version* 11 by Jim Gettys, Ron Newman and Robert W. Scheifler and *X Window System Protocol, Version* 11 *Beta Test* by Robert W. Scheifler. These publications are available to use, copy, modify and distribute for any purpose without fee. Information on the X Window System may be obtained from the Massachusetts Institute of Technology Laboratory for Computer Science, 545 Technology Square, Cambridge, Mass. 02139.

The X Window System is based upon a client—server model. The application 100 is the client which accomplishes its work by communicating its requests to a server process 101. The server 101 performs the requested function and returns a status to the client application 100. The major components of the X Window System are an X protocol 102, the server 101 and an XLib 103.

The X protocol 102 defines a model for communication between a server 101 and a client 100, and also defines the model for the graphics subsystem 17. The model consists of several objects which interact in specified ways. The most fundamental object is the window, a rectangular array of pixels which may or may not be (partially) visible on the monitor 38 at a given time. Windows are in a hierarchy: in other words, windows may have sub-windows. When a sub-window is displayed, it will be clipped against its parent. The monitor is the root of the hierarchy. Each window has a unique ID, an optional property list, and may be manipulated by a process 100 other than the creating process 100. The X protocol 102 neither imposes nor encourages limits on the number of windows in existence (i.e. windows are "cheap"). Other objects defined by the X protocol 102 include Color Maps: associations between pixel values and colors pixmaps: a rectangular array of pixels tiles: a special kind of pixmap used to fill regions and define cursors polylines: a set of related points which are displayed in a window according to specified criteria (glyph) fonts: a set of bitmaps which correspond to alphanumeric characters (includes proportional fonts)

The X protocol 102 also defines a number of events. These events are detected by the server 101 as, e.g., inputs received from peripheral devices via the control processor 13 and peripheral repeater box 23 (see FIG. 3) and are passed on to clients 100. Examples of events are Exposure events: part of a displayed window which was previously occluded has now been uncovered Keyboard events: a key on the display has been pressed Button Events: a button on a pointing device (e.g. mouse 20) has been depressed.

Clients 100 only receive notification of events in which they have explicitly expresed interest. Events are maintained in a time-ordered queue, and can be received by clients 100 either synchronously or asynchronously.

The X Server 101 mediates communication between client applications 100 and the graphic subsystem 17. Each client 100 establishes a connection to the server 101 via a communications protocol. A client 100 will send commands to a server 101 to perform functions such as drawing into a window, loading fonts, manipulating the color map, expressing interest in certain events, etc. The X Server 101 will then perform the requested functions, by, e.g., sending commands to the graphics subsystem 17 via a node in the structure memory 26.

A server 101 is always located on the same machine as the monitor 38. It is possible for there to be more than one server per machine, and for a server to control more than one monitor 38. Each monitor 38, however, may be controlled by at most one server.

The server 101 provides a device independent (DDI) program which interfaces with a device dependent (DDX) program for communication from the X Window system to the specific system of the invention upon which the windowing system is operating. With respect to the present invention, the most significant feature of the DDX is the three dimensional display context functions of the traversal control implemented through a display manager 106 in the windowing server 101 to connect a window defined by a client application 100 to the three dimentional graphics structure built by the client application 100 in the structure memory 26, as will appear. In this manner, a three dimensional functionality is merged into the X Window System.

Xlib 103 is the Client's interface to an X Server. It is a procedural interface which corresponds to the functions provided by the underlying X protocol 102. Thus, there are calls to create windows, draw into them, etc. Since Xlib is a procedural interface, it is designed to be called from higher-level languages.

A window manager 104 is an application which implements a human-workstation interface. It typically provides a user with the ability to create, move, resize, iconify, and destroy windows. These actions are indicated by using the mouse 20 as a pointing device, in conjunction with button clicks and keyboard hits. Although the X protocol 102 does not specify any one window manager, there are currently several from which to choose. X provides the necessary features for a customized window manager implementation. This means that a window manager is not necessary for X applications to run and it is possible to have multiple window managers (not at the same time on the same display, however).

A graphic package may be layered on top of the X Window System, as, for example, a GKS o/b package. In the present invention a graphics package is used for two dimentional displays through bit map graphics. Indeed, the X Window System was devloped for use in connection with bit map graphics systems. The bit map graphics contexts and command queues are processed by the rendering processor 36, as will appear.

Pursuant to the invention, three dimensional graphics data structures are built by the application clients 100 directly through structured graphics routines 105 (SGR) which are provided in the host subsystem. The applications 100 utilize the various structured graphics routines 105 as required to build specific graphics data structures. The structured graphics routines execute routine requests made by the application 100 and build appropriate linked nodes in the structure memory 26.

The following are several examples of structured graphics routines which may be provided in the host subsystem for implementation of graphics data structures.

EXAMPLE 1

SGR$BEGIN_STRUCTURE

FORMAT
SGR$BEGIN_STRUCTURE(context)
ARGUMENTS
context

The identifier the graphics context for this subroutine call. The context argument is the address of an unsigned integer that contains the identifier of the graphics context block.

PURPOSE
To begin a structure.
DESCRIPTION

A structure is a group of nodes linked together. After calling SGR$BEGIN_STRUCTURE, all nodes created with the same context are added to the end of the structure. No nodes are created by SGR$BEGIN_STRUCTURE. A structure is terminated by SGR$END_STRUCTURE.

The information for linking nodes is stored in the graphics context referenced by the context argument, so it is possible to build multiple structures at the same time using multiple contexts.

Calling SGR$BEGIN_STRUCTURE for a context which is not building a structure is an error.

It may be desireable to begin each structure with a node that does nothing, such as a data node or a disabled node. This permits the structure to be referenced by multiple nodes and still permits replacement of the first true node in the structure.

EXAMPLE 2

SGR$COLOR

FORMAT
SGR$COLOR(context, red, green, blue, color) ARGUMENTS
context

The identifier of the graphics context for this subroutine call. The context argument is the address of an unsigned integer that contains the identifier of the graphics context block.

red

The red intensity of the color. The red argument is the address of an unsigned longword in F_floating format that contains the value for red intensity. This value is in the range 0.0 (no intensity) to 1.0 (full intensity).

green

The green intensity of the color. The green argument is the address of an unsigned longword in F_floating format that contains the value for the green intensity. This value is in the range 0.0 (no intensity) to 1.0 (full intensity).

blue

The blue intensity of the color. The blue argument is the address of an unsigned longword in F_floating format that contains the value for the blue intensity. This value is in the range 0.0 (no intensity) to 1.0 (full intensity).

color

The color longword returned by the routine. The color argument returns the address of an unsigned longword that returns the value for color.

PURPOSE
To create a color word.
DESCRIPTION

This routine creates a color composed of red, green, and blue intensities. The format of a color word is shown in following scale.

Color is passed as an argument to SGR$SET_BACKGROUND, SGR$SET_LINE_COLOR, and SGR$STATUS.

RELATED ROUTINES
SGR$SET_BACKGROUND
SGR$SET_LINE_COLOR
SGR$SET_SURFACE_COLOR
SGR$STATUS.

EXAMPLE 3

SGR$VECTOR

FORMAT
SGR$VECTOR (context, vertex_format, edit_flags, count, vertex_array, handle)
AGRUMENTS
context The identifier of the graphics context for this subroutine call. The context argument is the address of an unsigned integer that contains the identifier of the graphics context block.

vertex_format

Flags declaring the format of the vertices passed by the vertex_array argument. The vertex_format argument is an unsigned longword that contains the following flags:

| Flag | Description |
| --- | --- |
| SGR$M_STATUS | When set, each vertex in the array contains a status word. |
| SGR$M_X_ | When set, each vertex in the array contains a coordinate for x. |
| SGR$M_Y | When set, each vertex in the array contains a coordinate for y. |
| SGR$M_Z | When set, each vertex in the array contains a coordinate for Z. |
| SGR$M_W | When set, each vertex in the array contains a coordinate for w. | edit_flags

Flags specifying how the routine will format the status words of itemized vertices as it stores them in the node. The edit_flags argument is the address of an unsigned longword that contains the following flags:

| Flags | Description |
| --- | --- |
| SGR$M_EDIT_POLYLINE | When set, creates default status words for itemized |

-continued

| Flags | Description |
|---|---|
| | vertices with separate draw mode. |
| SGR$M_EDIT_SEPARATE | When set, creates default status words for itemized vertices with polyline draw mode. |

If neither DGR$M_EDIT_POLYLINE nor SGR$M_EDIT_SEPARATE is set in the edit_flags argument, the status words of itemized vertices are not changed and the status word must be filled in properly for each vertex. The edit_flags argument does not affect vertices without status words.

count

The number of vertices passed by the vertex_array argument. The count argument is the address of an unsigned longword.

vertex_array

The array of vertices defining the vectors to be drawn. The vertex_array argument is the address of an array of longwords; this array must contain the number of longwords equal to the value passed by the count argument multiplied by the number of vertex components indicated by the number of flags set in vertex_format. For example, if vertex_format declares a 3D-with-status vertex format (by setting SGR$M_STATUS, SGR$M_X, SGR$M_Y, and SGR$M_Z in the vertex_format argument) and the count argument declares that the number of vertices is 10, then the vertex array must contain 40 longwords. Vertex components must be in the order status, x, y, z, w. All coordinates must be of the default floating-point format set in the graphics context.

handle

The identifier of the node created by this routine. The handle argument returns the address of an unsigned longword that contains the identifier.

PURPOSE

To create a vector node.

DESCRIPTION

This routine creates a vector node. When this node is traversed by the structure walker 27, data is forwarded to the garphics subsystem 17 to draw the vectors to be displayed, as described above. In order to be visible the vectors must be properly transformed (for example, they must be within the clipping planes), have correct attributes (such as a color different from the background color), and must not be obscured by polygons.

Each vertex can have a status word and x,y, z, and w coordinates. The status word sets the draw mode and-/or itemized vector color is enabled.

EXAMPLE 4

SGR$X_ROTATE_MATRIX

FORMAT

SGR$X_ROTATE_MATRIX(context, multiply_control, angle, matrix)

ARGUMENTS context

The identifier of the graphics context for this subroutine call. The context argument is the address of an unsigned integer that contains the identifier of the graphics context block.

Multiply_control

Specifies how the matrix argument is to be interpreted. The multiply_control argument is the address of an unsigned longword. Acceptable values are:

| Constant | Function |
|---|---|
| SGR$K_REPLACE | The matrix argument returns the new matrix produced by this routine: Matrix new matrix |
| SGR$ K-PREMUILTIPLY | The matrix argument supplies a matrix to which the new matrix produced by this routine is premultiplied. The matrix argument then returns the resulting matrix: Matrix New_matrix x matrix |
| SGR$ K-POSTMULTIPLY | The matrix argument supplies a matrix to which the new matrix produced by this routine is postmultiplied. The matrix argument then returns the resulting matrix: matrix matrix x new_matrix | angle

The angle of rotation in radians. The angle argument is the address of a longword in F_floating format.

matrix

The x-rotation matrix created by this routine. The matrix argument returns the address of a 4×4 array of longwords in F_floating format containing the result matrix. The matrix is in row major order.

PURPOSE

To create an x-rotation matrix.

DESCRIPTION

This routine computes a rotation matrix to rotate about the x axis. The resulting rotation is angle radians clockwise as viewed from the +x axis. The rotation matrix is returned in the matrix argument.

Any number of additional routines may be stored in the host subsystem to enable an application process 100 to build a graphics data linked node structure representative of a three dimensional image in color for storage in the structure memory 26 and eventual traversal by the structure walker 27. The following is an example of a complete structured graphics routine library with the routines listed by function:

TABLE 1

| SGR Primitive Routines | |
|---|---|
| Primitive SGRs | Arguments |
| SGR$POLYGON | context, vertex_format, flags, plane_equation, count, vertex_array, handle |
| SGR$STRING | context, vertex_format, vertex, flags, count, string, handle |
| SGR$VECTOR | context, vertex_format, edit_flags, count, vertex_array handle |
| Primitive Utility SGRs | Arguments |
| SGR$PLANE_EQUATION | context, vertex_format, negate, count, vertex_array, plane_equation |
| SGR$STATUS | context, flags, color, |

TABLE 1-continued

SGR Primitive Routines

| | status |
|---|---|

TABLE 2

SGR Attribute Routines

| General Attribute SGRs | Arguments |
|---|---|
| SGR$SET_BACKGROUND | context, color, handle |
| SGR$SET_GEOMETRY_MASK | context, enable_mask, disable_mask, handle |
| SGR$SET_INTENSITY_RANGE | context, minimum, maximum, handle |
| SGR$SET_LINE_COLOR | context, color, handle |
| SGR$SET_LINE_FILTER | context, filter, handle |
| SGR$SET_LINE_PATTERN | context, flags, dash_mask, dot_mask, mask_bits, pattern_length, fill_color, handle |
| SGR$SET_RENDERING_MASK | context, enable_mask, disable_mask, handle |

| Vector Attribute SGRs | Arguments |
|---|---|
| SGR$SET_MARKER_TYPE | context, glyph, handle |
| SGR$SET_VECTOR_DRAW_MODE | context, draw_mode, handle |

| Polygon Attribute SGRs | Arguments |
|---|---|
| SGR$SET_LIGHT | context, light_id, light, handle |
| SGR$SET_LIGHTING_STYLE | context, style, handle |
| SGR$SET_LIGHT_MASK | context, enable_mask, disable_mask, handle |
| SGR$SET_SHADING_STYLE | context, style, handle |
| SGR$SET_SURFACE_COLOR | context, side, color, handle |
| SGR$SET_SURFACE_PROPERTIES | context, side, properties, handle |

| String Attribute SGRs | Arguments |
|---|---|
| SGR$DO_STRING_CHARACTERS | context, handle |
| SGR$DO_STRING_MATRIX | context, handle |
| SGR$DO_STRING_POSITION | context, handle |
| SGR$SET_STRING_FONT | context, flags, spacing_handle, process_handle, glyph_handles, handle |
| SGR$SET_STRING_SPACING | context, spacing_vector, handle |

| Attribute Utility SGR | Arguments |
|---|---|
| SGR$COLOR | context, flags, red, green, blue, color |

TABLE 3

SGR Rendering Routines

| Rendering SGRs | Arguments |
|---|---|
| SGR$BEGIN_RENDERING | context, style, handle |
| SGR$END_RENDERING | context, handle |

TABLE 4

SGR Transformation Routines

| Matrix Composition SGRs | Arguments |
|---|---|
| SGR$CONCAT_MATRIX | context, flags, matrix, normal_matrix, handle |
| SGR$LOAD_MATRIX | context, flags, matrix, normal_matrix, handle |
| SGR$SUBSTITUEE_MATRIX | context, flags, matrix, normal_matrix, handle |

| Modeling SGRs | Arguments |
|---|---|
| SGR$A_ROTATE_MATRIX | context, multiply_control, angle, point1, point2, matrix |
| SGR$SCALE_MATRIX | context, multiply_control, vector, matrix |
| SGR$TRANSLATE_MATRIX | context, multiply_control, vector, matrix |
| SGR$ROTATE_MATRIX | context, multiply_control, angle, matrix |
| SGR$Y_ROTATE_MATRIX | context, multiply_control, angle, matrix |
| SGR$Z_ROTATE_MATRIX | context, mutiply_control, |

TABLE 4-continued

| SGR Transformation Routines | |
|---|---|
| | angle, matrix |
| Viewing SGRs | Arguments |
| SGR$LOOK_AT_VIEW_MATRIX | context, multiply_control, from, to, up, matrix |
| SGR$POLAR_VIEW_MATRIX | context, multiply_control, view_flag, point, distance, azimuth, incidence, twist, matrix |
| Projection SGRs | Arguments |
| SGR$ORTHOGRAPHIC_PROJ_MATRIX | context, multiply_control, height, aspect, front, back, matrix |
| SGR$PERSPECTIVE_PROJ_MATRIX | context, multiply_control, angle, height, aspect, front, back, matrix |
| String Matrix SGRs | Arguments |
| SGR$SET_STRING_MATRIX | context, matrix, handle |
| General Matrix Utility SGRs | Arguments |
| SGR$COPY_MATRIX | context, from_matrix, to_matrix |
| SGR$IDENTITY_MATRIX | context, matrix |
| SGR$INVERSE_MATRIX | context, matrix, inverse_matrix |
| SGR$MULTIPLY_MATRICES | context, prematrix, postmatrix, result_matrix |
| SGR$NORMAL_MATRIX | context, prematrix normal_matrix |

TABLE 5

| SGR Viewport Routines | |
|---|---|
| Viewport SGRs | Arguments |
| SGR$CONCAT_VIEWPORT | context, left_bottom, right_top, handle |
| SGR$LOAD_VIEWPORT | context, left_bottom, right_top, handle |
| SGR$SUBSTITUTE_VIEWPORT | context, left_bottom, right_top, handle |

TABLE 6

| SGR Structure Building Routines | |
|---|---|
| Structure Building SGRs | Arguments |
| SGR$BEGIN_STRUCTURE | context |
| SGR$END_STRUCTURE | context, handle |

TABLE 7

| SGR Reference Routines | |
|---|---|
| | Arguments |
| Unconditional Reference SGR | |
| SGR$CALL | context, reference_mode, reference_handle, handle |
| Conditional Reference SGRs | |
| SGR$CASE | context, reference_mode, mode, opspec, count, otherwise_handle, case_handles, handle |
| SGR$COMPARE | context, reference_mode, model, opspec1, mode2, opspec2, less_handle, equal_handle, greater_handle, handle |
| SGR$TEST | context, reference_mode, mode, opspec, true_handle, false_handle, handle |
| SGR$SEST_AND_CLEAR | context, reference_mode, mode, opspec, true-handle, false_handle, handle |
| SGR$TEST_CLEAR | context, reference_mode, model, opspec1, mode2, |

TABLE 7-continued

| SGR Reference Routines | |
|---|---|
| | Arguments |
| | opspec2, true_handle, false_handle, handle |
| SGR$TEST_SET | context, reference_mode, model, opspec1, mode2, opspec2, true-handle, false_handle, handle |
| Arithmetic and Assignment SGRs | |
| SGR$ADD | context, model, opspec1, mode2, opspec2, handle |
| SGR$CLEAR_BITS | context, model, opspec1, mode2, opspec2, handle |
| SGR$MOVE | context, model, opspec1, mode2, opspec2, handle |
| SGR$MOVE_BLOCK | context, size, model, opspec1, mode2, opspec2, handle |
| SGR$MOVE_MASK | context, mask, model, opspec1, mode2, opspec2, handle |
| SGR$SET_BITS | context, model, opspec1, mode2, opspec2, handle |
| SGR$SUB | context, model, opspec1, mode2, opspec2, handle |
| SGR$XOR | context, model, opspec1, mode2, opspec2, handle |

TABLE 8

| SGR Graphics Context Routines | |
|---|---|
| Graphics Context SGRs | Arguments |
| SGR$COPY_CONTEXT | from_context, to_context |
| SGR$CREATE_CONTEXT | display, context |
| Graphics Context Editing SGRs- | |
| Inquiry | Arguments |
| SGR$INQ_DEF_BASE_GEOMETRY | context, geometry |
| SGR$INQ_DEF_BLINK_PERIODS | context, on, off |
| SGR$INQ_DEF_BUFFERING_MODE | context, mode |

TABLE 8-continued

SGR Graphics Context Routines

| | |
|---|---|
| SGRSINQ_DEF_DRAWABLE | context, drawable |
| SGRSINQ_DEF_FIRST_PICK | context, pick-number |
| SGRSINQ_DEF_FP_FORMAT | context, fp_format, fp_block_exponent |
| SGRSINQ_DEF_HIT_BOX_LOCATION | context, hit_box_location |
| SGRSINQ_DEF_HIT_BOX_SIZE | context, hit_box_size |
| SGRSINQ_DEF_LINE_FILTER | context, filter_number, filter_values |
| SGRSINQ_DEF_PATH_STACK | context, path_size |
| SGRSINQ_DEF_PICK_ID_STACK | context, pick_id_size |
| SGRSINQ_DEF_PICK_LIMIT | context, pick_limit |
| SGRSINQ_DEF_PICK_QUEUE | context, pick_size, path_size, pick_id_size |
| SGRSINQ_DEF_REPEAT_PERIOD | context, period |
| SGRSINQ_DEF_TRAVERSAL_ID | context, traversal_id |
| SGRSINQ_DEF_TRAVERSAL_MODE | context, modeflags |
| SGRSINQ_DEF_UPDATE_MODE | context, update_mode |
| SGRSINQ_DEF_VERTEX | context, vertex_4d |
| SGRSINQ_DEF_VIRTUAL_ROOT | context, handle |

Graphics Context Editing SGRs-

| Setting | Arguments |
|---|---|
| SGRSSET_DEF_BASE_GEOMETRY | context, geometry |
| SGRSSET_DEF_BLINK_PERIODS | context, on, off |
| SGRSSET_DEF_BUFFERING_MODE | context, mode |
| SGRSSET_DEF_DRAWABLE | context, drawable, attach_detach |
| SGRSSET_DEF_FIRST_PICK | context, pick_number |
| SGRSSET_DEF_FP_FORMAT | context, fp_format, fp_block_exponent |
| SGRSSET_DEF_HIT_BOX_LOCATION | context, hit_box_location |
| SGRSSET_DEF_HIT_BOX_SIZE | context, hit_box_size |
| SGRSSET_DEF_LINE_FILER | drawable, filter_number, filter_values |
| SGRSSET_DEF_PATH_STACK | context, path_size |
| SGRSSET_DEF_PICK_ID_STACK | context, pick_id_size |
| SGRSSET_DEF_PICK_LIMIT | context, pick_limit |
| SGRSSET_DEF_PICK_QUEUE | context, pick_size, path_size, pick_id_size |
| SGRSSET_DEF_REPEAT_PERIOD | context, period |
| SGRSSET_DEF_TRAVERSAL_ID | context, traversal_id |
| SGRSSET_DEF_TRAVERSAL_MODE | context, modelglags |
| SGRSSET_DEF_UPDATE_MODE | context, update_mode |
| SGRSSET_DEF_VERTEX | context, vertex_4d |
| SGRSSET_DEF_VIRTUAL_ROOT | context, handle |

TABLE 9

SGR Traversal Control Routines

| Traversal Control SGRs | Arguments |
|---|---|
| SGRSSADD_TO_QUEUE | context, queue_handle, first_handle, last_handle |
| SGRSSQUEUE | context, reference_mode, first_handle, current_handle, last_handle, handle |
| SGRSSREMOVE_FROM_QUEUE | context, queue_handle, first_handle, last_handle |
| SGRSINQ_TRAVERSAL_STATE | context, traversal_type, waitflag, state |
| SGRSRELEASE_UPDATES | context |

TABLE 9-continued

SGR Traversal Control Routines

| Traversal Control SGRs | Arguments |
|---|---|
| SGRSREQUEST_TRAVERSAL | context, traversal_type |

TABLE 10

SGR Picking Routines

| Picking SGRs | Arguments |
|---|---|
| SGRSCOMPUTE_PICK_POINT | context, node_picked, type, pick_vector, vert-geom_mat, user_vector |
| SGRSCONCAT_PICK_ID | context, identifier, handle |
| SGRSGET_PICK | context, max_path_pairs, max_pick_ids, status, node_picked, type, index, pick_vector, vert_geom_mat, num_pairs_ret, path, num_ids_ret, pick_ids |
| SGRSLOAD_PICK_ID | context, identifier, handle |
| SGRSPRINT_PICK | context, max_pathpairs, max_pick_ids, status, node_picked, type, index, pick_vector, vert_geom_mat, num_pairs_ret, path, num_ids_ret, pick_ids |
| SGRSSUBSTITUTE_PICK_ID | context, identifier, handle |

TABLE 11

SGR Input Handling Routines

| Input Handling SGRs | Arguments |
|---|---|
| SGRSALLOCATE_DEVICE | context, device |
| SGRSCONNECT_DEVICE_TO_MAT | context, device, handle, geometric_operation, axis, matrix_operation, value-usage_flag |
| SGRSDISCONNECT_DEVICE_FROM_MAT | context, device, handle |
| SGRSSISPATCH_DEVICE_EVENT | context, event |
| SGRSFIND_DEVICE | context, display, device-type, unit, device_id[, nBins[, nDims]] |
| SGRSFREE_DEVICE | context, device |
| SGRSGET_DEVICE_ATTR | context, device, attrBlock |
| SGRGET_DEVICE_CHARS | context, device, nBins, nDims, ndevice, nextdevice |
| SGRSGET_DEVICE_VALUE | context, device, valueBlock |
| SGRSSET_DEVICE_AST | context, device, valueBlock, eventcode, action, parameter |
| SGRSSET_DEVICE_ATTR | context, device, attrBlock |
| SGRSSET_DEVICE_LABEL | context, device, label, count |
| SGRSSET_DEVICE_VALUE | context, device, valueBlock |

TABLE 12

SGR Structure Editing Routines

| Structure Topology SGRs | Arguments |
|---|---|
| SGRSINQUIRE_LINKS | context, handle, prev_handle, next_handle |
| SGRSINQUIRE_REFERENCE | context, handle, index, reference_handle |
| SGRSPOSTFIX_NODE | context, handle, new_handle |

TABLE 12-continued

SGR Structure Editing Routines

| | |
|---|---|
| SGRSPREFIX_NODE | context, handle, new_handle |
| SGRSREPLACE_INDIRECT | context, handle, indirect_handle |
| SGRSPREPLACE_NEXT | context, handle, new_next_handle |
| SGRSREPLACE_NODE | context, handle, new_handle |
| SGRSREPLACE_REFERENCE | context, handle, index, reference_handle |

| Node Editing SGRs-Inquiry | Arguments |
|---|---|
| SGRSINQUIRE_BITMASKS | context, handle, enable_bits, disable_bits |
| SGRSINQUIRE_CHARACTERS | context, handle, first_postition, last_postition, string_size, result_count, result_string |
| SGRSINQUIRE_COLOR | context, handle, color |
| SGRINQUIRE_DEFAULT_VERTEX | context, handle, vertex_4d |
| SGRSINQUIRE_FP_BLOCK_EXPONENT | context, handle, fp_block_exponent |
| SGRSINQUIRE_INDIRECT | context, handle, indirect_handle |
| SGRSINQUIRE_INTENSITY_RANGE | context, handle, minimum, maximum |
| SGRSINQUIRE_LINE_FILTER | context, handle, filter |
| SGRSINQUIRE_MATRIX | context, handle, flags, matrix, normal_matrix |
| SGRSINQUIRE_NODE_ENABLE | context, handle, onoff |
| SGRSINQUIRE_NODE_TYPE | context, handle, node_type |
| SGRSINQUIRE_OPSPEC | context, handle, opspec_id, opspec |
| SGRSINQUIRE_PICK_ID | context, handle, identifier |
| SGRSINQUIRE_PLANE_EQUATION | context, handle, plane_equation |
| SGRSINQUIRE_REF_COUNT | context, handle, result_system_count, result_user_count |
| SGRSINQUIRE_STRING_SPACING | context, handle, spacing_vertex |
| SGRSINQUIRE_USER_DATA | context, handle, user_data |
| SGRSINQUIRE_USER_TYPE | context, handle, user_type |
| SGRSINQUIRE_USER_TYPE | context, handle, user_type |
| SGRSINQUIRE_VERTICES | context, handle, first_position, last_position, array_size, result_count, result_vertex_array |
| SGRSINQUIRE_VIEWPORT | context, handle, left_bottom, right_top |

| Node Editing SGRs-Replacement | Arguments |
|---|---|
| SGRSREPLACE_BITMASKS | context, handle, enable_bits, disable_bits |
| SGRSREPLACE_CHARACTERS | context, handle, position, delete_count, insert_count, insert_string, result_handle |
| SGRSREPLACE_COLOR | context, handle, color |
| SGRSREPLACE_DEFAULT_VERTEX | context, handle, vertex_4d |
| SGRSREPLACE_FP_BLOCK_EXPONENT | context, handle, fp_block_exponent |
| SGRSREPLACE_INTENSITY_RANGE | context, handle, minimum, maximum |
| SGRSREPLACE_LINE_FILTER | context, handle, filter |
| SGRSREPLACE_MATRIX | context, handle, flags, matrix, normal_matrix |
| SGRSREPLACE_NODE_ENABLE | context, handle, onoff |
| SGRSREPLACE_OPSPEC | context, handle, opspec_id, opspec |
| SGRSREPLACE_PICK_ID | context, handle, identifier |
| SGRSREPLACE_PLANE_EQUATION | context, handle, plane_equation |
| SGRSREPLACE_STRING_SPACING | context, handle, spacing_vertex |
| SGRSREPLACE_USER_DATA | context, handle, user_data |
| SGRSREPLACE_USER_TYPE | context, handle, user_type |
| SGRSREPLACE_VERTICES | context, handle, position, delete_count, insert_count, insert_vertices, result_handle |
| SGRSREPLACE_VIEWPORT | context, handle, left_bottom, right_top |

TABLE 13

SGR Structure Memory Management Routines

| Structure Memory ManagementSGRs | Arguments |
|---|---|
| SGRSDECREMENT_REF_COUNT | contex, handle |
| SGRSINCREMENT_REF_COUNT | context, handle |

TABLE 14

SGR General Purpose Routines

| General Purpose SGRs | Argument |
|---|---|
| SGRSDATA | context, size, data, handle |
| SGRSGENERIC | context, size, data, handle |
| SGRSINDIRECT | context, to_handle, handle |

Figure 4:
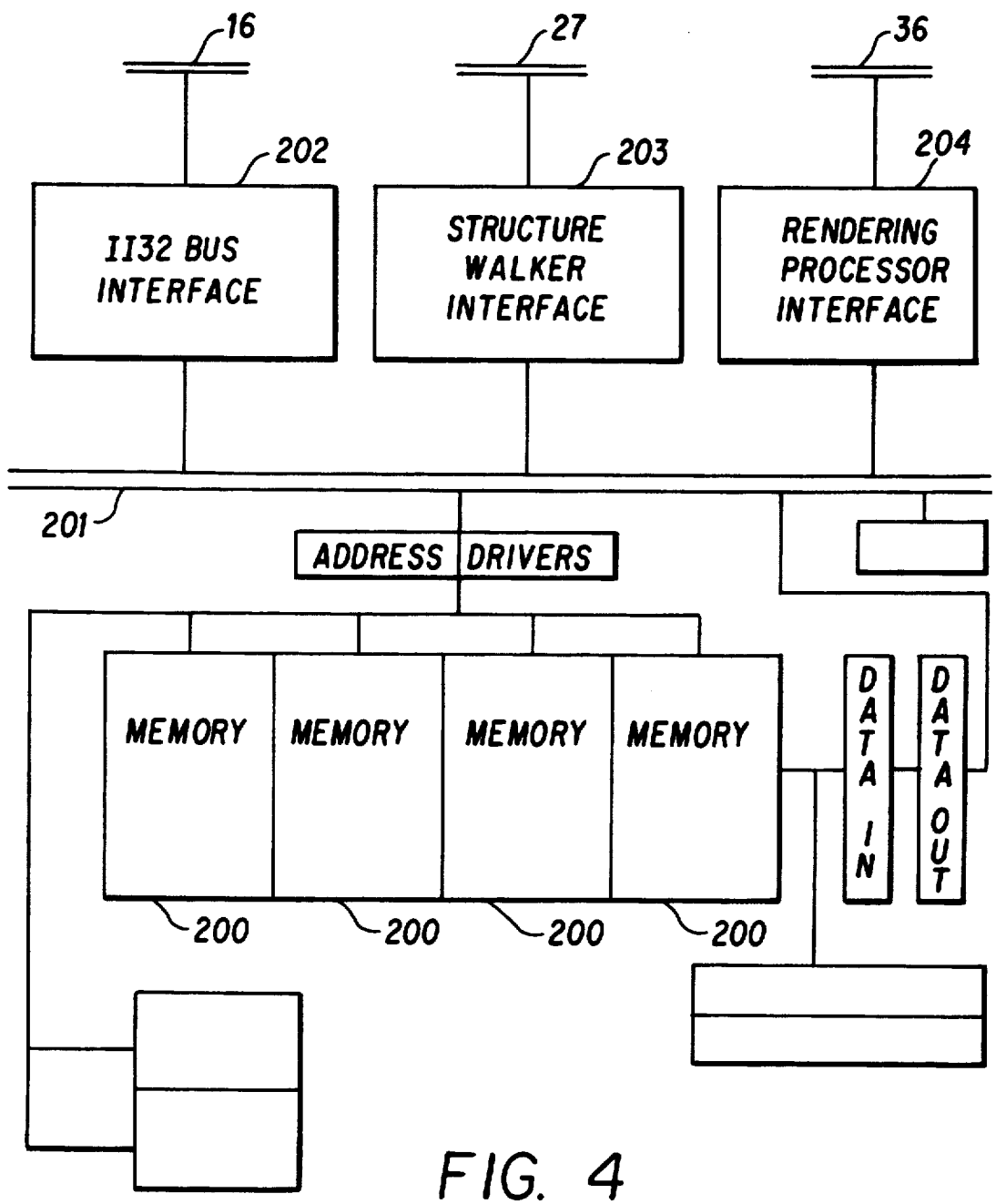
FIG. 4 is a block diagram of the structure memory of the graphics of FIG. 2.

Referring now to FIG. 4, the structure memory 26 is illustrated in block diagram form. The structure memory's main function is to store the "working copy" of the graphics data structure built by the application programs 100 residing in the host central processing unit 10 either through the structured graphics routines or the bit map graphics package layered on the X Window System. The memory is made up of an array of memory devices 200 which are implemented as 256K CMOS DRAMS, each with a minimum memory size of one megabyte. The array of memory devices 200 is arranged for a total of four megabytes of memory. A random access taken 200 ns and a static column mode is used to achieve sequential access of 100 ns per word.

A structure memory bus 201 interfaces the memory devices with an II32 Bus interface 202, a structure walker interface 203 and a rendering processor interface 204 to provide data flow between the memory devices 200 and the host central processing unit 10 via the control processor 13, the rendering processor 36 and the structure walker 27, respectively. The structure walker 27 is a special purpose, 32 bit bit-slice processor programmed to traverse the three dimensional graphics data structure nodes, as described above. For a more detailed description of the structure memory 26 and structure walker 27 components of the graphics subsystem 17 reference should be made to the Shadowfax Technical Manual published by the Evans & Sutherland Computer Corporation.

Traversal Control

In accordance with a significant teaching of the invention, a traversal control function is partitioned among the components of the host and graphics subsystems to accept requests for graphics structure traversals made by the several, competing application programs 100 residing in the host control processing unit 10 and to subsequently schedule and dispatch such traversal requests.

The traversal control functions are embodied in node control structures built in the structure memory 26 which, when traversed, provide a traversal request mechanism and handle traversal scheduling, traversal monitoring and application synchronization. The control structures function to place the graphics subsystem 17 at the disposal of all the several applications programs 100 residing in the central processing unit 10 such that each program views the graphics subsystem 17 as its own. The traversal control structures therefor coordinate traversal requests from the competing application programs 100 with the asynchronous operation of the structure walker 27 to maximize the processing capability of the graphics subsystem 17 and enable a multiple of application programs to be processed.

Pursuant to the invention there are three basic traversal sturctures: a system control structure (SCS), three dimensional display contexts (3DDCs) and three dimensional graphics contexts (3DGCs). The system control structure is the top-level control for the structure walker 27 and acts as the structure walker 27 operating system. The display contexts define the mapping of three dimensional images within viewports on the monitor screen defined by windows. The graphics contexts provide all the graphics attributes and control information required to perform the traversals of graphics data structures including a connection to a complementary display context.

The control structures are interconnected by attaching a doubly-linked list of graphics contexts created by applications to the system control structure. Each of the graphics contexts in the list contains one display context root node used to link the graphic context to a display context and one virtual root node used as a link to a graphics data structure. (See FIG. 5) Display contexts may be shared among multiple graphics contexts allowing several graphics contexts to operate within a single window. Moreover, all or part of a graphics data structure may be shared among a number of graphics contexts.

SYSTEM CONTROL STRUCTURE

The System Control Structure (SCS) serves as the executive program for the structure walker 27 in that it performs the following functions:

- Detects and accepts requests for 3DGC traversals.
- Schedules and dispatches all 3DGC traversals.
- Effects updates to 3DDCs.
- Deactivates 3DGCs and 3DDCs as requested by the traversal control function in the server 101.

SCS CREATION AND CONTROL

As a part of the DDX startup procedure, the windowing server 101 will invoke a traversal control function to allocate and generate the graphics data structure nodes required for the SCS structure and to initiate its traversal.

Once started, the SCS continues running (i.e., being traversed) until all traversal requests have been satisfied. Once all requests have been serviced, the SCS will suspend itself by requesting the control processor 13 to resume its traversal at the next vertical retrace event, thus preventing excessive SCS request processing. Only under the following exceptional circumstances will SCS traversal be terminated, requiring restart by the server 101:

(a) The server 101 detects a traversal-timeout condition.

(b) An SCS-detected error condition is detected.

(c) The server 101 has terminated SCS traversal by issuing a "Server Rundown" request, as part of the server rundown procedure.

(d) The structure walker 27 encounters an error condition, at which time it will halt after notifying the control processor 13.

SCS DATA BLOCK

In order to perform its function, the SCS structure maintains a group of control variables in the structure memory 26 known collectively as the "SCS data block". The contents of this data block are described below.

- SCS.State

This longword indicates the current state of SCS execution by taking on one of the following values:

SGR$$K_STATE_INITIAL—SCS has yet to complete its initial processing.

SGR$$K_STATE_UPDATE—SCS is performing SCS update processing.

SGR$$K_STATE_IDLE—SCS has suspended itslef after finding no traversal requests pending and expects to be resumed by the control processor 13 at the next vertical retrace event.

SGR$$K_STATE_REQ_PHASE—SCS is performing request processing.

SGR$$K_STATE_EVENT—SCS has presented an event to the control processor 13 and expects to be resumed immediately.

SGR$$K_STATE_TRAV_PHASE—SCS is performing traversal processing.

SGR$$K_STATE_RANDOWN—SCS has processed a "Server Rundown" request.

SGR$$K_STATE_TRAV_UPDATE—SCS is performing SCS-deferred updates on the client's graphics display structure.

SGR$$K_STATE_TRAV_CXT_SETUP—SCS is performing 3DGC-setup processing.

SGR$$K_STATE_TRAV_CXT_CLEANUP—SCS is performing 3DGC-cleanup processing.

SGR$$K_STATE_TRAV_3DDC—The 3DDC structure is being traversed.

SGR$$K_STATE_TRAV_CLIENT—The client's 100 graphics display structure is being traversed.

SGR$$K_STATE_INT_ERROR—SCS has suspended itself after detecting an internal error.

The structure walker 27 requires exclusive write access to this longword.

- SCS.Frame_Bank

This is a system-wide longword flag indicating which frame buffer bank is being displayed.

SGR$$K_BANK_A—Frame Buffer Bank "A" is currently being displayed.

SGR$$K_BANK_B—Frame Buffer Bank "B" is currently being displayed.

The structure walker 27 requires exclusive write access to this longword.

- SCS.WLUT_Bank

This is a system-side longword flag indicating which image bank of the window look up table (WLUT) is active.

SGR$$K_SIDE_A—Window Image Bank "A" is currently active.

SGR$$K_SIDE_B—Window Image Bank "B" is currently active.

The structure walker 27 requires exclusive write access to this longword.

○ SCS.Perform_Traversal

This longword flag is used internally by the SCS to detect the absence of traversal requests at the end of request processing. The structure walker 27 requires exclusive write access to this longword.

○ SCS.Swap_Bank_Request

This longword flag is used internally by the SCS to remember that the frame buffer bank must be swapped at the end of traversal processing. It is set by 3DDCs of frame-bank double-buffered windows. The structure walker 27 requires exclusive write access to this longword.

○ SCS.Swap_WLUT_Request

This longword flag is used internally by the SCS to remember that the window image bank of the WLUT must be swapped at the end of traversal processing. It is set by 3DDCs of WLUT-bank double-buffered windows. The structure walker 27 requires exclusive write access to this longword.

○ SCS.Server_Rundown

The windowing server 101 can set this flag non-zero to cause the structure walker 27 to terminate traversal of the SCS gracefully (at the completion of traversal phase processing). The structure walker 27 will clear it as its final action before suspending SCS traversal.

○ SCS.Num_Passes

This longword contains a count of the passes made through the SCS main loop. The structure walker 27 requires exclusive write access to this longword.

○ SCS.Num_Frames

This longword contains a count of times SCS traversal processing has been performed. The structure walker 27 requires exclusive write access to this longword.

○ SCS.Previous_Time

At the start of each request/traversal loop of the SCS, this longword is loaded with a 60 Hz, control processor 13 maintained system time value. It is used to determined the SCS.Elapsed Time.

○ SCS.Elapsed_Time

This longword is used to hold the interval of 60 Hz system time which elapses between request/traversal loops of the SCS. This value is used in blink and repeated traversal scheduling algorithms.

○ SCS.Watchdog_Timer

The SCS will load this longword with a maximum processing interval at certain points in its execution. The traversal control function within the server 101 will periodically decrement this timer and perform timeout processing if the timer reaches zero.

○ SCS.Event_Pointer

This longword contains the virtual address of a block of data attached to an event. The structure walker 27 requires exclusive write access to this longword.

○ SCS.Queue_Node

This longword contains the handle of a queue node within the SCS_Update_Processing substructure.

○ SCS.Pick_Id_Stack

This longword contains the handle of a system-default Pick ID Stack node.

○ SCS.Pick_Path_Stack

This longword contains the handle of a system-default Pick Path Stack node.

○ SCS.Call_Update_Node

This longword contains the virtual address of the call node in SCS update processing. This node is required by the update mechanism to perform deferred updates to the SCS. The structure walker 27 requires exclusive write access to this longword.

○ SCS.Num_GCs

This longword reflects the number of 3DGCs in the 3DGC list attached to the SCS. The structure walker 27 requires exclusive write access to this longword.

○ SCS.GC_List_Head

○ SCS.GC_List_Tail

These longwords describe the doubly-link list of 3DGCs attached to the SCS. They are pointers which contain the structure memory addresses of 3DGC data blocks, or are both "null", indicating the absence of 3DGCs. The structure walker 27 requires exclusive write access to these longwords.

○ SCS.DC_List_Head

○ SCS.DC_List_Tail

These longwords describe the doubly-link list of 3DDCs attached to the SCS. They are pointers which contain the structure memory 26 addresses of 3DDCs. The structure walker 27 requires exclusive write access to these longwords.

○ SCS.Current_GC_Pointer

This longword is loaded with the structure memory 26 address of the 3DGC data block currently being processed by SCS traversal processing. The structure walker 27 requires exclusive write access to this longword.

○ SCS.Current_DC_Pointer

This longword is loaded with the structure memory 26 address of the 3DDC data block attached to the 3DGC currently being processed by SCS traversal processing. The structure walker 27 requires exclusive write access to this longword.

○ SCS.Current_Client_Pointer

This longword is loaded with the structure memory 26 address of the root of the client 100 graphics data structure attached to the 3DGC currently being processed by SCS traversal processing. The structure walker 27 requires exclusive write accesss to this longword.

○ SCS.Current_GC_ID

This longword is loaded with the graphics context indentification "GC ID" of the 3DGC being processed by SCS traversal processing. The client processes 100 may inspect this longword to determine which of the possibly several 3DGCs has requested its traversal ○ SCS.Current_GC_Start_Time ○ SCS.Current_GC_End_Time These longwords are loaded with the control processor 13 maintained system time at which traversal of the 3DGC commenced and completed, respectively. The structure walker 27 requires exclusive write access to these longwords.

○ SCS.Current_Traversal_Type

The contents of this longword reflect the type of traversal currently being performed. The structure walker 27 requires exclusive write access to this longword.

SGR$$K_DRAW_TRAVERSAL
SGR$$K_HITTEST_TRAVERSAL
SCS ORGANIZATION

The organization of the SCS structure is illustrated below.

The SCS structure alternates between request and traversal processing modes. During the request mode, each 3DGC on 3DGC list attached to the SCS will be visited in sequence. If requests for traversals are outstanding and the current state of the 3DGC permits, flags in the 3DGC data block will be updated to cause the appropriate traversals in traversal processing. In addition, draw traversals will be performed on all those 3DGCs sensitive to either the frame buffer bank or window look-up table image bank if at least one draw traversal request has been made to 3DGC of that particular class.

Given that at least one valid traversal request was detected in request processing, the traversal processing mode will proceed to satisfy all requests accepted. This is done by visiting each 3DGC on the 3DGC list sequentially, and there performing hit-test and draw traversals (in that order), as required. Any grouping of the two types of traversals may be performed on a 3DGC each in a given traversal pass, provided that the corresponding requests were issued. If no traversal requests are outstanding, the SCS will be held suspended until the next vertical retrace event, at which point request processing will once again be performed. This is done to avoid an unnecessary load on the structure memory 26.

```
BEGIN SCS
    Define state and matrix stack overflow areas;
    IF (SCS State = "Initial") THEN
    3D_Graphics_Initialization;
    ENDIF
    Clear SCS.Perform_Traversal;
    WHILE (NOT SCS.Server_Rundown) DO
        Set SCS.Watchdog_Timer;
        SCS_Update_Processing;
        Request_Processing;
        Traversal_Processing;
    END DO
    Clear SCS.Server_Rundown;
    SCS.State = "Randown";
END SCS
BEGIN 3D_Graphics_Initialization
    Initialize the SCS.Frame_Bank to Bank "A" [being
    displayed]
    Initialize the SCS.WLUT_Bank to Bank "A" [active]'
    Clear both valid planes;
    Initialize_Hierarchial State'
END 3D_Graphics_Initialization
```

When SCS traversal commences, the SCS will immediately define the state and matrix stack overflow areas, initialize some internal flags, and proceed to enter its main processing loop.

SCS_Update_Processing

The first part of SCS loop is SCS Update Processing. This section performs deferred updates to the SCS through the use of the Update Mechanism

```
BEGIN SCS_Update_Processing
    SCS.State = "Update_Phase";
    Perform updates to SCS via call to
    SCS.Call_Update_Node;
    END SCS_Update_Processing
```

REQUEST PROCESSING

The request processing portion or mode of the SCS loop performs two functions. The first function is to effect modifications to the 3DDC data blocks. To do this, request processing will examine all 3DDCs known to the system and toggle the "active half" of those which have swap requests pending. This processing is performed here to assure consistent 3DDC data during request and traversal processing.

Secondly, request processing gathers traversal requests from 3D clients 100 and the display manager (from information contained in 3DDC data blocks). This processing is performed by traversing the 3DGC structures contained in the 3DGC list. Each 3DGC, after detecting the "Request Phase" SCS State, will respond to all outstanding traversal requests directed towards it. Results of this request processing are retained within the 3DGC.

In addition, if double-buffered 3DGCs are visited (those with 3DDCs sensitive to either the frame buffer bank or window look-up table image bank), a request to swap the particular bank will be recorded. This will be used to force draw traversal of all such 3DGCs, and cause the actual swapping commands to be delivered at the end of traversal processing.

If no traversal requests are detected after visiting each 3DGC, the SCS will put itself to sleep. The control processor 13 (ACP) will resume SCS traversal at the next vertical retrace event.

```
BEGIN Request_Processing
    SCS.State = "Request_Phase";
    Clear SCS.Swap_Bank_Request;
    Clear SCS.Swap_WLUT_Request;
    DO
        Increment SCS.Num_Passes;
        SCS Elapse_Time = System VR Count SCS Previous_Time;
        SCS Previous_Time = System VR Count;
        Traverse_DC_List
        Traverse_GC-List
        IF (NOT SCS.Perform_Traversal) THEN
            SCS.State = "Idle";
            Request ACP to resume SCS at next VR event;
            Suspend traversal;
            SCS.State = "Request_Phase";
        ENDIF
    UNTIL (SCS.Perform_Traversal OR SCS.Server_Rundown)
END Requst_Processing
BEGIN Traverse_GC_List
    RO = SCS.GC_List_Head;
    WHILE (RO [GC handle] NOT NULL) DO
        Save physical addr of 3DGC data block in
    SCS.Current_GC_Ptr;
        Generic_3DGC;
        RO = GC.Flink;
    ENDDO
END Traversal_GC_List
BEGIN Traverse_DC_List
    RO = SCS.DC_List_Head;
    WHILE (RO [DC handle] NOT NULL) DO
        IF (3DDC.System_Enabled) THEN
            IF (3DDC.Kill) THEN
                Clear 3DDC.Kill;
                Clear 3DDC.System_Enabled;
                Remove_DC_Links
                Set 3DDC.Dead;
            ELSE
                IGNORE_ATTENTION_INTERRUPTS;
                IF (3DDC.Clear_Request) THEN
                    Clear 3DDC.Clear_request;
                    Send 3DDC.Clear Window generic node to clear
                    window;
                    IF (3DDC.Swap_Request) THEN
                        Toggle 3DDC.Active_Half;
                        Clear 3DDC.Swap_Request;
                    ENDIF
                ALLOW_ATTENTION_INTERRUPTS;
                IF (3DDC.Clear_Request) THEN
                    Clear 3DDC.Clear_Request;
                    Send 3DDC.Clear Window generic node to clear
                    window;
                ENDIF
            ENDIF
        RO = 3DDC.Flink;
    ENDDO
END Traverse_DC_List
BEGIN Remove_DC_Links
```

```
RO = SCS.GC_List_Head;
WHILE (RO [GC handle] NOT NULL) DO
    IF (3DGC.System_Enabled) THEN
        IF (3DGC.DC_Data_Ptr = 3DDC_being_deleted [R1])
THEN
            3DGC.DC_Data_Ptr = NULL;
        ENDIF
    ENDIF
    RO = 3DGC.Flink;
ENDDO
END Remove_DC_Links
```

TRAVERSAL PROCESSING

The traversal processing portion or mode of the SCS loop visits each 3DGC described in the 3DGC list. This action will initiate traversals depending on results of request processing and mode information contained within each 3DGC. Certain hardware-specific operations bracket the actual context traversals. In addition, one or both bank flags may be toggled as a result of window-type detection performed in the previous request processing.

```
BEGIN Traversal_Processing
    SCS.State = "Traversal Phase";
    IF (SCS.Perform_Traversal) THEN
        Clear SCS.Perform_Traversal;
        Perform Traversal setup actions;
        Traverse_GC_List;
        IF (SCS.Swap_Bank_Request) THEN
            Toggle SCS.Frame_Bank;
            Command RP to swap banks, clear valid plane;
        ENDIF
        IF (SCS.Swap_WLUT_Request) THEN
            Toggle SCS.WLUT_Bank;
            Command RP to swap WLUT image banks;
        ENDIF
        Perform Traversal cleanup actions;
        Increment SCS.Num_Frames;
END Traversal_Processing
```

GRAPHIC CONTEXTS

A 3D Graphics Context (3DGC) control structure contains the graphics attributes and control information required to request and perform all types of traversals of a client 100 graphics data structure.

Although "3DGC" is referred to as a unique instance of the 3DGC structure, the traversal control maintains but a single instance of the actual control structure, known as the "generic" 3DGC. This structure is passed a pointer to a "3DGC data block" which provides the information corresponding to a particular 3DGC instance. It is these 3DGC data blocks which are maintained on the 3DGC list.

3DGC CREATION AND CONTROL

A 3DGC is created by the server 101 whenever a client 100 calls SGR$CREATE_CONTEXT. Once the 3DGC is allocated and generated, the server 101 will place it on tail of the 3DGC list. When the server 101 detects that a client 100 has terminated, all 3DGCs owned by that client will be deactivated. The corresponding 3DGC data blocks will not be unlinked and reused until request processing has acknowledged the deactivation request.

The client 100 may bind a 3DDC to a 3DGC by making the following SGR call:

SGR$SET_DEF_DRAWABLE gc, window_id, flag

A client may bind a client 100 graphics data structure to a 3DGC by making the following SGR call:

SGR$SET_DEF_VIRTUAL_ROOT gc, handle

3DGC DATA BLOCK

The generic 3DGC structure is passed a pointer to the "3DGC data block" corresponding to the 3DGC being traversed. This data block contains control information specific to the 3DGC and is defined below.

○ 3DGC.Flink
○ 3DGC.Blink

These longwords contain structure memory addresses which serve as links in the doubly-linked 3DGC list. The traversal control function in the server 101 requires exclusive write access to these longwords.

○ 3DGC.System Enabled

This longword flag is set by the SCS when the 3DGC is added to the 3DGC list. It is cleared by the server 101 when (1) a traversal timeout occurs while this 3DGC was being traversed, or (2) a deactivation request is detected by the SCS. When this flag is set, the 3DGC is effectively removed from the system.

○ 3DGC.Kill

This longword flag is set by the traversal control function in the server 101 when the owning client 100 dies. It is effectively a deactivation request and is cleared by the SCS as an acknowledgement that the 3DGC is no longer active.

○ 3DGC.Dead

This longword flag is set by the SCS when a kill request is detected. It is used to identify those 3DGC data blocks on the 3DGC list that may be unlinked and reused by the traversal control function in the server 101.

○ 3DGC.System_Flags

This longword contains bit flags used by the SCS. The structure walker 27 requires exclusive write access to this longword.

Do_DC_Draw
Do_Client_Draw
Do_Hit_Test

These flags serve to record traversal requests accepted by SCS request processing.

Bank_2B
WLUT_2B

These flags are set/cleared by request processing to record the type of double-buffering indicated by the attached 3DDC (if any). Traversal processing will use these flags to determine whether a draw traversal must be performed on this 3DGC even in the absence of an explicit request.

○ 3DGC.Num_Request_Passes
○ 3DGC.Num_Traversal_Passes

These longwords reflect the number of times this particular 3DGC has been traversed and why. The structure walker 27 requires exclusive write access to these longwords.

○ 3DGC.Num_Timeouts

This longword contains a count of the number of times a timeout occurred when this 3DGC was being traversed.

○ 3DGC.Num_Update

This longword contains a count of the number of times an update queue node within this 3DGC has been traversed.

○ 3DGC.Blink_On_Timer

This longword is used to determine when a "blink-on" traversal is to be performed.

○ 3DGC.Blink_Off_Timer

This This longword is used to determine when a "blink-off" traversal is to be performed.

○ 3DGC.Repeat_Timer

This longword is used to determine when a "repeated" traversal is to be performed.

○ 3DGC.TCID

This longword contains the X Window System resource number of the traversal context associated with this 3DGC.

○ 3DGC.Traversal_Type

This longword contains a copy of SCS.Current Traversal_Type which is made available to the client structure to allow traversal type-specific processing.

○ 3DGC.Num_Draw Traversals

○ 3DGC.Num_Hit_Test_Traversals

These longwords contain counts of the number of traversals. The structure walker 27 requires exclusive write access to these longwords.

○ 3DGC.Blink State

This longword contains the current blink state:
SGR$K_BLINK_ON
SGR$K_BLINK_OFF

○ 3DGC.Blink_Mask

This longword contains a copy of the SCS.Blink_Mask made available to the client structure for aperiodic blink operations.

○ 3DGC.VR_Count

This longword contains a copy of the 60 Hz system time.

○ 3DGC.GC ID

This longword contains a 3DGC identifier assigned by the server 101, which may be modified by the client 100 as required. The SCS uses the address of the 3DGC data block to distinguish 3DGCs, so this ID need not be unique.

○ 3DGC.DC_Data_Pointer

This longword contains the structure memory address of the 3DDC data block attached to this 3DGC, or zero if one is not attached. The traversal control function in the windowing server 101 requires exclusive write access to this longword.

○ 3DGC.Client_Root

This longword contains the structure memory address of the client display structure attached to this 3DGC, or zero if one is not attached. The client process 100 owning the 3DGC requires exclusive write access to this longword.

○ 3DGC.Call_Update_Node

This longword contains the virtual address of a Call node which will be traversed prior to any draw traversal. This node is required by the update mechanism to perform deferred updates to the attached client structure. The structure walker 27 requires exclusive write access to this longword.

○ 3DGC.Client_Flags

This longword contains traversal mode bits controlled by the client 100 through the following SGR call:

SGR$SET_DEF_TRAVERSAL_MODE gc, mode-flags

Automatic—When set and the attached 3DDC is a "double-buffered" window, the SCS is able to re-traverse this 3DGC whenever the system display buffers are swapped.

Redisplay—When set, the display manager within the server 101 is allowed to request draw traversals of this 3DGC as required to maintain a correct image on the display.

Repeated—When set, draw traversals of this 3DGC will be performed at a periodic rate, as determined by 3DGC.Repeat_Period.

Blink—When set, draw traversals of this 3DGC will be performed at a dual-periodic rate, as determined by 3DGC.Blink_On_Period and 3DGC.Blink_Off_Period.

○ 3DGC.Blink_On_Period
○ 3DGC.Blink_Off_Period
○ 3DGC.Repeat_Period

These longwords contain time intervals which determine the periodicity of draw traversals when repeated or blink traversals mode is in effect.

○ Client_Draw_Request

This longword flag is set non-zero by the client in order to request a draw traversal via the following SGR call:

traversal_type=SGR$K_DRAW_TRAVERSAL
SGR$REQUEST_TRAVERSAL display, gc, traversal_type The SCS will clear the flag after the request is detected.

○ Client_Draw_Pending

This longword flag is set non-zero by the SCS to indicate that a client draw request has been seen. The SCS will clear the flag after the traversal has completed.

Notify_on_Draw

This longword flag is set non-zero by the windowing server 101 when the client 100 requests notification of draw traversal completion. The SCS will clear the flag after the traversal is complete, just prior to passing the event to the control processor 13.

○ Draw_Sequence Number

The contents of this longword are included in the notification event delivered as a result of a completed draw traversal. The traversal control function in the server 101 requires exclusive write access to this longword.

○ Client Hittest_Request
○ Client_Hittest_Pending
○ Notify_on_Hittest
○ Hittest Sequence_Number These These longwords are used for hittest traversals in a fashion similar to the draw traversal variables mentioned above.

○ Sync_Request
○ Sync_Pending
○ Notify_on_Sync
○ Sync_Sequence_Number

These longwords are used by the server 101 in order to synchronize with the SCS.

3DGC ORGANIZATION

The 3DGC is split into request processing and traversal processing, depending upon the content of the SCS State variable.

The request processing requires that the 3DGC be enabled by both the system and the client 100 before any traversal request processing is performed. If this condition is met, requests for service traversals will be accepted. Then, if a "visible" 3DDC has been bound to the 3DGC, draw traversal requests will be accepted. If the client 100 has disabled this 3DGC and requested acknowledgement, the client 100 will be notified.

Traversal processing performs hit-test and draw traversals (in that order) if corresponding requests are outstanding. Acknowledging "notification events" will be posted if requested by the client 100.

Deactivation processing will be performed regardless of the SCS State. If the 3DGC is system-enabled and a "kill" request is pending, the 3DGC will be tagged as "dead" and made system-disabled. Although still linked to the 3DGC list, the 3DGC data block will then be available for unlinking and reuse.

```
BEGIN Generic_3DGC
    IF (3DGC.System_Enabled) THEN
        DO CASE (SCS.State)
        CASE Request_Phase:
            Clear 3DGC.System_Flag
            IF (3DGC.Kill) THEN
                Clear 3DGC.Kill
                Clear 3DGC.System Enabled;
                Set 3DGC.Dead;
                Event_Notify (opcode = SCS_EVENT_GC_DEATH,
                    header = 3DGC, num = 0,
                    reason = GC_DEATH,
                    status = OK);
                SCS.State = "Request Phase";
            ELSEIF (3DGC.Sync_Request) THEN
                Clear 3DGC.Sync_Request;
                IF (3DGC.Notify on_Sync) THEN
                    Clear 3DGC.Notify on_Sync;
                    Event_Notify (opcode = SCS EVENT_SYNC,
                        header = 3DGC,
                        num = 3DGC.Sync_Seq.
                        reason = SYNC,
                        status = OK;
                    SCS.State = "Request_Phase";
                ENDIF ELSE
                Update_Request Processing;
                Hittest_Request_Processing;
                Draw Request_Processing;
            ENDIF
            Increment 3DGC.Num_Request_Passes;
        CASE Traversal_Phase:
            Do_Hittest_Processing;
            Do_Draw_Processing;
            Increment 3DGC.Num_traversal_Passes;
        ENDCASE
    ENDIF
END Generic_3DGC BEGIN Update_Request_Processing
    DGC.Client_Update_Pending = 3DGC.Client_Update
        Request;
    Clear 3DGC.Client_Update_request;
    SCS.State = "Traversing Client Update List"
    Traverse 3DGC.Update_List to peform deferred updates;
    Increment 3DGC.Num_Update;
    SCS.State = "Request_Phase"

Clear 3DGC.Client Update_Pending;
    IF (3DGC.Notify_on_Update) THEN
        Clear 3DGC.Notify_on_Update;
        Event_Notify (opcode = SCS_EVENT_UPDATE,
            header = 3DGC, num = 3DGC.Update Seq,
            reason = UPDATE,
            status = OK);
        SCS.State = "Request Phase"
    ENDIF
END Update_Request_Processing BEGIN Draw_Request_Processing
    IF (3DGC.DC_Data_Ptr != NULL) THEN
        IF (3DGC.Visible) THEN
            R1 = 3DDC(R0).Draw_Request
            R2 = 3DDC(R0).Format
            R0 = SCS.Current_GC Ptr
            3DGC.CLIENT_Draw_Pending = 3DGC.Client_Draw
                Request;
            If (3DGC.Client_Draw_Pending) THEN
                Clear 3DGC.Client_Draw_Request;
                Set 3DGC.Do_Client_Draw;
                Set SCS.Perform_Traversal;
            ENDIF
            IF (3DGC.Client_Flags.Repeated)
                THEN CALL Repeat_Mode_Processing;
            ENDIF
            IF (3DGC.Client_Flags.Blink) THEN
                CALL Blink_Mode_Processing;
            ENDIF
            IF (3DGC.Client_Flags.Redisplay) THEN
                IF (3DGC.Draw_Request) THEN
                    Set 3DGC.Do_DC_Draw;
                    Set SCS.Perform_Traversal;
                ENDIF
            ENDIF
            IF (3DGC.Format indicates Bank 2B) THEN
                Set 3DGC.Bank_2B;
                IF (3DGC.Do_Client_Draw OR 3DGC Do._DC_Draw)
                THEN
                    Set SCS.Swap_Bank_Request;
                ENDIF
            ELSEIF (3DDC.FormatINDICATES WLUT 2B) THEN
                Set 3DGC.WLUT_2B;
                IF (3DGC.Do_Client_Draw OR 3DGC.Do_DG_Draw)
                Then Set SCS.Swap_WLUT_Request;
                ENDIF
            ENDIF ENDIF Visible
        ENDIF Attached to window
    END Draw_Request_Processing BEGIN Repeat_Mode_Processing
    IF (3DGC.Repeat_Timer <= SCS.Elapsed_Time) THEN
        Set 3DGC.System Flags.Do_Client_Draw,Do_Repeated
        Set SCS.Perform_Traversal;
        3DGC.Repeat_Timer = 3DGC.Repeat_Period;
    ELSE
        Decrement 3DGC.Repeat_Timer by SCS.Elapsed_Time;
    ENDIF
END Repeat Mode_Processing BEGIN Blink_Mode_Processing
    IF (3DGC.Blink_State = "Off") THEN
        IF (3DGC.Blink Off_Timer <= SCS.Elapsed_Time) THEN
            Set 3DGC.System_Flags.Do_Client_Draw,Do_Blink
            Set SCS.Perform_Traversal;
            3DGC.Blink_State = "On";
            3DGC.Blink Off_Timer = 3DGC.Blink_Off Period;
        ELSE
            Decrement 3DGC.Blink_Off_Timer by SCS.Elapsed Time;
    ELSE
        IF (3DGC.Blink_On Timer <= SCS.Elapsed_Time) THEN
            Set 3DGC.System_Flags.Do_Client_Draw,Do_Blink
            Set SCS.Perform_Traversal;
            3DGC.Blink_State = "Off";
            3DGC.Blink_On_Timer = 3DGC.Blink_On_Period;
        ELSE
            Decrement 3DGC.Blink_On_Timer by SCS.Elapsed Time;
        ENDIF
    ENDIF
END Blink_Mode_Processing BEGIN Do_Draw_Processing
    IF (3DGC.Do_Client_Draw) THEN
        Clear 3DGC.Do_Client_Draw;
        SCS.Current Traversal_Type - "Draw";
        Draw_Traversal;
        Clear 3DGC.Client_Draw_Pending;
        IF (3DGC.Notify_on_Draw) THEN
            Clear 3DGC.Notify_on_Draw;
            Send "Begin_3D_Context" to RP to allow BM processing;
            Send Event_Notify (opcode = SCS_EVENT/DRAW,
                header-3DGC,
                num = 3DGC.Draw_Seq,
                reason = DRAW,
                status = OK);
            SCS.State = "Traversal_Phase"
        ENDIF
    ELSE IF (3DGC.Do_DC_Draw) THEN
        Clear 3DGC.Do_DC_Draw;
        SCS.Current_Traversal_Type = "Draw";
        Draw_Traversal;
        Clear 3DDC.Draw_request;
        ELSE IF (SCS.Swap_Bank_Reqeuest) AND (3DGC.Bank_2B
        OR (SCS.Swap_WLUT_Request) AND (3DGC.WLUT_2B)
        IF (3DGC.Client_Flags.Automatic) THEN
```

```
         SCS.Current_Traversal_Type = "Draw";
      Draw_Traversal;
      ENDIF
   ENDIF
END Do-Draw Processing BEGIN Draw_Traversal
      SCS.State = "Traversing Update List"
      Process client updates via 3DGC.Call Update_Node;
      Increment 3DGC.Num_Update;
      SCS.State = "Traversing Context Setup"
      Perform 3D Context setup actions;
      SCS.Current_DC_Ptr = 3DGC.DC_Data_Ptr;
      SCS.State = "Traversing 3DDC"
      Traverse (generic) 3DDC to set-up rendering
      (window) environment;
      (Restore R0 = (SM) address of current 3DGC);
      SCS.Current_Client Ptr = 3DGC.Client_Root;
      SCS.Current_GC_ID = 3DGC.GC_ID;
      3DGC.Current_Traversal Type = "Draw"
      3DGC.Blink Mask = System Blink Mask (ala ACP);
      3DGC.VR_Count = System VR Count (ala ACP);
      SCS.Current_GC_Start_Time = System VR Count (ala
      ACP);
      SCS.State = "Traversing Client"
      Traverse Client Structure to draw client's image;
      SCS.Current_GC_End_Time = System VR Count (ala
      ACP);
      Restore R0 = (SM) address of current 3DGC;
      SCS.State = "Traversing Context Setup"
      Perform 3D Context cleanup actions;
      Increment 3DGC.Draw_Count;
      SCS.State = "Traversal Phase"
   END Draw_Traversal BEGIN Hittest_Request_Processing
      3DGC.Client_Hittest Pending = 3DGC.Client Hittest
      Request;
      IF (3DGC.Client_Hittest_Pending) THEN
         Clear 3DGC.Client_Hittest_Request;
         Set 3DGC.Do_Hittest;
         Set SCS.Perform_Traversal;
      ENDIF
END Hittest_Request_Processing BEGIN Do_Hittest_Processing
      IF (3DGC.Do_Hittest) THEN
         Clear 3DGC.Do_Hittest;
         SCS.Current_Traversal_Type = "Hittest";
         Hittest_Traversal;
            Clear 3DGC.Client_Hittest_Pending;
            IF (3DGC.Notify_on_Hittest) THEN
               Clear 3DGC.Notify_on_Hittest;
               Send "Begin_3D Context" to RP to allow BM
               processing;
               Event_Notify (opcode=SCS_EVENT/HITTEST,
                  header=3DGC,
                  num=3DGC.Hittest_Seq,
                  reason=HITTEST,
                  status=OK);
                     SCS.State = "Traversal_Phase"
            ENDIF
      ENDIF
END Do_Hittest_Processing BEGIN Hittest_Traversal
      SCS.State = "Traversing Context Setup"
      Perform 3D Context setup actions;
      SCS.Current_Client_Ptr = 3DGC.Client_Root;
      SCS.Current_GC_ID = 3DGC.GC_ID;
      3DGC.Current Traversal_Type = "Hittest"
      3DGC.Blink_Mask = System Blink Mask (ala ACP);
      3DGC.VR_Count - System VR Count (ala ACP);
      SCS.Current_GC_Start_Time = System VR Count (ala
      ACP);
      SCS.State = "Traversing Client"
      Traverse Client Structure to hittest client's image;
      SCS.Current_GC_End_Time = System VR Count (ala
      ACP);
      Restore R0 = (SM) address of current 3DGC;
      SCS.State = "Traversing Context Setup"
      Perform 3D Context cleanup actions;
      Increment 3DGC.Hittest Count;
      SCS.State = "Traversal Phase"
END Hittest-Traversal
```

DISPLAY CONTEXTS

A 3D Display Context (3DDC) control structure determines the mapping of client-generated images onto a rectangular area of the screen. When called from the 3DGC, the 3DDC loads subsystem state related to the associated display manager window (the rendering enviroment). The 3DDC is passed an indication of which bank is currently being display. This is used to set up bank-sensitive attributes, such as write masks, etc.

The rendering environment includes:
- Window Number
- Window Mask
- Foreground Color
- Background Color
- Base Matrix
- Base Viewport
- Pixel Format
- Default Line Filter
- Pixel Processor setting
- Filter Rounding Enable/Disable
- Use Valid Plane on FB Read
- Frame Buffer Write Mask
- Pipeline Enable Mask Although a "3DDC" is referred to as a unique instance of the 3DDC structure, the traversal control maintains but a single instance of the actual control structure, known as the "generic" 3DDC. This structure is passed a pointer to a "3DDC data block" which provides the information corresponding to a particular 3DDC instance.

3DDC CREATION AND CONTROL

A client process 100 creates a window by making the appropriate call to the windowing system 101,102,103. As a result of this action, the Display Manager passes a description of the window (in a "3DDC descriptor") to the traversal control function in the server 101. This routine will allocate a 3DDC data block and format it with information extracted from the 3DDC descriptor. If the client 100 desires to attach this window to a 3DGC (or later detach it), it will make the following SGR call. This routine, depending on the flag parameter, will either enter or remove the address of the 3DDC data block in the corresponding 3DGC data block.

SGR$SET_DEF_DRAWABLE gc, window_id, flag

The display manger is able to modify the 3DDC data block in response to changes to the window attributes. A draw traversal request will be issued for all 3DGCs attached to this 3DDC if the 3DDC retains visibility after modification.

3DDC DATA BLOCK

- 3DDC.Flink
- 3DDC.Blink

These longwords contain structure memory 26 addresses which serve as links in the doubly-linked 3DDC list. The structure walker 27 requires exclusive write access to these longwords.

- 3DDC.System_Enabled

This longword flag is set by the SCS when the 3DDC is added to the 3DDC list. It is cleared by the SCS as a result of a deactivation request.

○ 3DDC.Kill

This longword flag is set by the traversal control function in the server 101 when the owning client 100 dies. It is effectively a deactivation request and is cleared by the SCS request processing as an acknowledgement that the 3DDC is no longer active.

○ 3DDC.Dead

This longword flag is set by the SCS when a kill request is detected. It is used to identify those 3DDC data blocks on the 3DDC list that may be unlinked and reused by the traversal control function in the server 101.

○ 3DDC.Swap_Request

This longword is used to synchronize structure walker 27 and server 101 access to the 3DDC data block. When the traversal control function in the server 101 finds this flag clear, it is immediately allowed access to the "inactive" half of 3DDC data block. At this point it can update the inactive half and set this longword non-zero. When the SCS finds this flag set, it will swap active and inactive halves and clear this flag.

If the traversal control function in the server 101 finds this flag set (indicating the SCS has yet to see a previous swap request), it has two options;

(a) It can wait until the SCS clears this flag. This will assure that the previously updated half is seen at least once.

(b) It can clear the flag itself, wait a short period of time, and then update the "inactive" half at that point. Note, however, that the previous swap request will most likely be ignored. The wait is required in case the SCS is currently processing the previous request. (Attention interrupts will be disabled by the SCS during this period (for 3 nodes), so this critical region is well bounded).

○ 3DDC.Active_Half

This longword indicates which of the "halves" of this 3DDC data block is currently being used by SCS request and traversal processing. If zero, the first half is active, otherwise the second half is active.

The 3DDC data block contains consecutive copies (halves) of the following group of items.

○ 3DDC.Visible

When this longword flag is non-zero, the window represented is (at least partially) visible on the screen. If zero, the window is either totally obscured or iconized, in which case draw traversals are not attempted.

○ 3DDC.Draw_Request

This longword flag is set non-zero at the behest of data manager in order to request draw traversals for all 3DGCs bound to this 3DDC. This action may be required, for example, when a window incurs an exposure event or resize operation. The SCS will clear this flag following the first draw traversal of a 3DGC bound to this 3DDC.

○ 3DDC.Window_Number

This longword contains the window number, in a format suitable for entry into a Generic node.

○ 3DDC.Window_Mask

This longword contains the window mask, in a format suitable for entry into a Generic node.

○ 3DDC.Pixel_Format

This longword contains the pixel format of this window.

1B, 4 bit Mapped
1B, 4 bit Gray Scale
1B, 8 bit Mapped
1B, 8 bit Gray Scale
1B, 12 bit RGB
1B, 24 bit RGB
WLUT 2B, 4 bit Mapped
WLUT 2B, 4 bit Gray Scale
WLUT 2B, 8 bit Mapped
WLUT 2B, 8 bit Gray Scale
WLUT 2B, 12 bit RGB
Bank 2B, 4 bit Mapped
Bank 2B, 4 bit Gray Scale
Bank 2B, 8 bit Mapped
Bank 2B, 8 bit Gray Scale
Bank 2B, 12 bit RGB
Bank 2B, 24 bit RGB ○ 3DDC.Background_Color This longword contains the window background color in a format suitable for entry into a Set Background node.

○ 3DDC.Foreground_Color

This longword contains the virtual address of the Base Matrix X3 node which is traversed to load the base matrix.

○ 3DDC.Base_Matrix_SGR

This longword contains the virtual address of the Base Matrix X3 node which is traversed to load the base matrix.

○ 3DDC.Base_Matrix_GDS

This longword contains the physical address of the Base Matrix graphics display structure node which is traversed to load the base matrix.

○ 3DDC.Base_Viewport_SGR

This longword contains the virtual address of the Base Viewport X3 node which is traversed to load the base viewport.

○ 3DDC.Base_Viewport_GDS

This longword contains the physical address of the Base Viewport graphics data structure node which is traversed to load the base viewport.

3DDC ORGANIZATION

```
BEGIN Generic_3DDC;
Use 3DDC.Active_Half to setup indirect addressing;
Load Base Matrix;
Load Base Normal Matrix;
Load Base Viewport;
Load Window Number;
Load Window Mask;
Load Foreground (Line) Color;
Load Background Color;
Format_Dependent_Setup;
Clear 3DDC.Draw_Request;
END Generic_3DDC;
BEGIN Format Dependent Setup
IF (DDC.Format.Buffering = "WLUT_Bank_Double
Buffered")
IF (SCS.WLUT_Bank = "A") THEN Plane Mask = 3DDC.
Plane Mast_B;
ELSE
Plane Mask = 3DDC.Plane_Mask_A;
ENDIF
Clear (input-side) window to the background color
ELSE
Plane Mask = 3DDC.Plane_Mask_A;
ENDIT
IF (3DDC.Format.Buffering = "Frame_Bank_
Double_Buffered")
THEN
IF (SCS.Frame Bank = "A") THEN (A being displayed)
Source Bank = "B";
Destination Bank = "B only;
```

```
-continued
Enable valid plane when reading pixels;
ELSE
Source Bank = "A";
Destination Bank = "A only";
Enable valid plane when reading pixels;
ENDIF
ELSE ("Single Buffered", "WLUT_Bank_Double_Buffered")
Source Bank = "A";
Destination Bank = "A and B";
Disable valid plane when reading pixels;
ENDIF
IF (3DDC.Format.Class = "Mapped") THEN
Load Pixel Proc ALU mode = "Store";
Disable rounding in PPA;
Disable additive blending on line crossings;
ELSE ("RGB", "GrayScale")
Load Pixel Proc ALU mode = "Add with Ceiling";
Enable rounding in PPA;
Enable additive blending on line crossings;
ENDIF
CASE 3DDC.Format.Depth
"4 bits":
Enable 4-bit ALU mode;
"8 bits":
Disable 4-bit ALU mode;
"12 bits":
Enable 4-bit ALU mode;
"24 bits":
Disable 4-bit ALU mode;
ENDCASE
END Format_Dependent_Setup
```

The following is a summary of the various routines at the disposal of the clients 100 and server 101 to enable them to interface with the traversal control structures.

SGR$CREATE_CONTEXT display, gc
display
This is the X Window System display variable which specifies a particular connection to a server 101.
This is the identifier of the 3DGC created.
A client process 100 will call this rountine to create a graphics context (3DGC).

SGR$SET_DEF_DRAWABLE gc, window_id, flag
gc
This is the "3DGC ID" of the 3DGC to be attached.
window_id
This longword contains an identification of the window which is to be attached to, or detached from, the 3DGC.
flag
If this longword is set non-zero, the window will be attached. If it is zero, the window will be detached.
A client process 100 will call this routine to attach or detach a window (3DDC) to or from a graphics context (3DGC).

SGR$SET_DEF_VIRTUAL_ROOT gc, handle
gc
This is the "3DGC ID" of the 3DGC to be attached.
handle
This longword contains the virtual address of the node which is to be entered as the root node of the 3DGC's client structure.
A client process 100 will call this routine to attach a graphic data structure (client structure) to a graphics context (3DGC).

SGR$SET_DEF_TRAVERSAL_MODE gc, modeflags
gc
This is the "3DGC ID" of the 3DGC to receive new traversal modes.
modeflags This longword specifies the traversal modes as described with respect to the 3DGC. Client_Flages on p. 69.
A client process 100 will call this routine to set-up the appropriate traversals modes of a 3DGC. These modes affect subsequent traversals of the 3DGC.

SGR$REQUEST_TRAVERSAL gc, traversal_type
gc
This is the 3DGC to be traversed.
traversal_type
This specifies the type of traversal desired:
* SGR$K_DRAW_TRAVERSAL—for a draw traversal
* SGR$K_HITTEST_TRAVERSAL—for a hit-test traversal
A client process 100 will call this routine to request that a particular type of traversal be performed on the 3DGC.

SGR$INQ_TRAVERSAL_STATE gc, traversal_type, waitflag, state
gc
This is the 3DGC in question.
traversal_type
This longword is used to specify the type of traversal in question.
* SGR$K_DRAW_TRAVERSAL—for draw traversal completion
* SGR$K_HITTEST_TRAVERSAL—for a hit-test traversal completion
waitflag
If this longword flag is non-zero, this routine will not return until the specified event has occurred. Otherwise the status of the event is returned immediately.
A client process 100 will call this routine in order to obtain status or notification of a particular traversal completion.

SGR$STARTUP
The server 101 will call this routine to initialize the traversal control function operating in the server process 101. This action includes the creation of all control structures and the commencement of SCS traversal.

SGR$CREATE_3DGC gc, 3dgc_db
gc
This is the identifier of the 3DGC to be created.
3dgc_db
The virtual address of the 3DGC data block associated with the new 3DGC is returned in this longword.
The server 101 will call this routine to create a new 3DGC structure in response to a client 100 invoking SGR$CREATE_CONTEXT.

SGR$CREATE_3DDC_descriptor, 3ddc_db
3ddc_descriptor
A structure of longwords, passed by reference, which contains an initial description of the window.
3ddc_db
The virtual address of the 3DDC data block created, returned by reference.
The server 101 will call this routine to create the 3DDC structure to be associated with a newly-defined window. The address of the 3DDC data block returned can subsequently be used to link this window to any number of 3DGCs.

SGR$UPDATE_3DDC 3ddc_descriptor, 3ddc_db
3ddc_descriptor
A structure of longwords, passed by reference, which contains an updated description of the window.
3ddc_cb The virtual address of the 3DDC data block to be updated, passed by reference.

The server 101 will call this routine to update the 3DDC structure associated with a newly redifined/modified window. This routine may request a draw traversal of all 3DGCs attached to this window, given that the window is visible and the 3DGCs are properly enabled.

SGR$RUNDOWN

The server 101 will call this routine to gracefully terminate traversal of the SCS.

Figure 5:
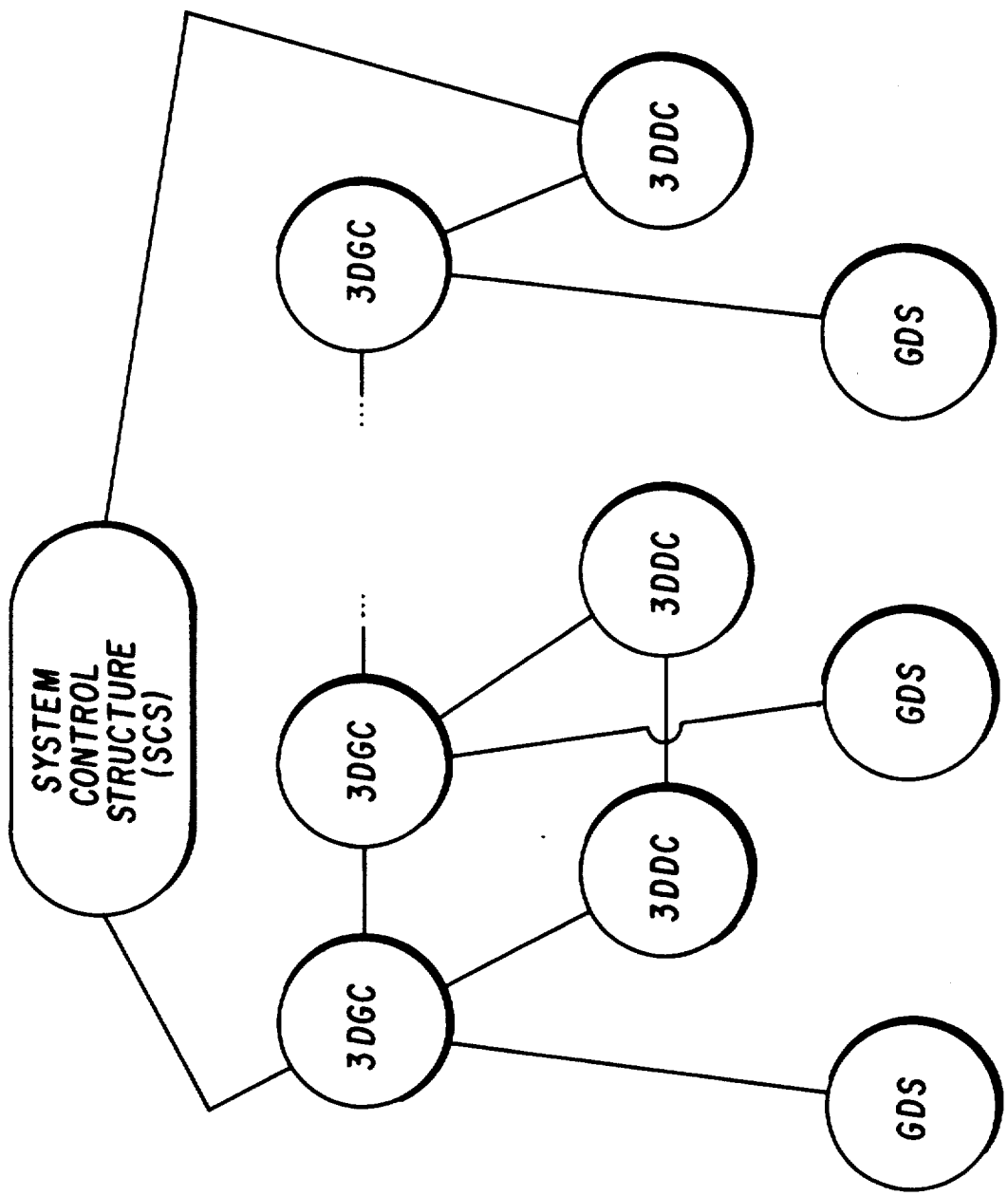
FIG. 5 is a block diagram of the organization of a node memory structure of a graphics data structure pursuant to the present invention.

From the above description of the traversal control functions it should be understood that the three dimensional graphics contexts (3DGC's) tie all of the traversal control functions together. The structure walker 27 traversal of each 3DGC through the request processing and traversal processing modes of the SCS provides the structure walker 27 with the graphics attributes and control information necessary to perform all traversals of a graphics data structure. As illustrated in FIG. 5. Each client 100 is provided with calls and routines to attach a graphics data structure (GDS) to a 3DGC through a 3D virtual root and to control traversal request flags in the attached 3DGC. The client 100 may also make a call to bind a 3DGC to the 3DDC created by the display manager to merge a three dimensional functionality into the X Window system. In this manner, the asynchronous traversal of the structure memory 26 is controlled by means of the traversal request mechanism available to the multiple clients 100 and through the request and traversal processing modes to systematically create a node traversal sequence for ordered flow of graphics data and commands to the graphics pipeline processor 29 through the line 30. The ordered flow of graphics data and commands assures maximum efficiency in the utilization of the resources of the graphics subsystem 17 to efficiently process a multiple of application programs by organizing traversal requests and related graphics data structures and window information through the 3DGCs and connected 3DDCs for the continuing asynchronous, traversal operation of the structure walker 27.

RENDERING PROCESSOR CONTROL AND BITMAPS GRAPHICS INTERFACE

The graphics subsystem 17 of the invention provides two types of graphics environments to the user: 3-D graphics, as described above, and bitmap (2-D) graphics. The bitmap environment is similar to its 3-D environment, though somewhat simpler. As with 3-D, a bitmap application communicates with the graphics subsystem 17 through the use of data structures stored in shared memory (structure memory 26). These data structures, the bitmap graphical data structures, are traversed and processed by the rendering processor 36.

The rendering processor 36 performs multiple tasks in the system: 3-D rendition, bitmap rendition, bitmap graphical data structure traversal, and video subsystem control. The term "rendition" in computer graphics refers to techniques used such as coloring, shading and lighting to realistically draw an object. The rendering processor 36 also regulates the scheduling of Bitmap and 3-D graphical operations. In addition to traversal and rendition, the rendering processor 36 also provides an interface for video subsystem (Color Lookup Table, Window Lookup Table, and Cursor Management).

The rendering processor 36 is a shared resource in the context of bitmap graphics. The graphics provides two levels of interface. The first interface provides primitive access to hardware/microcode facilities with little added abstraction. The second interface is a model level interface that provides the functionality and semantics expected by the standard Digital windowing systems (X or UIS). The interface between the rendering processor 36 and the rest of the graphics system was designed to optimize the sharing of the rendering processor 36 among bitmap graphics and 3-D graphics applications.

GRAPHICS CONTEXT

The rendering processor 36 and drawing hardware maintains state that is used or modified when graphics commands are executed. The total of all such state comprises a context in which drawing commands are executed. This context, the hardware context, is managed solely through the use of commands executed by the rendering processor 36.

A multitasking graphics environment is obtained by sharing the one hardware context among multiple graphics context. A graphics context represents a thread of execution and the state needed for the execution of commands in that thread. Multitasking is done much the same way that multiple process contexts share a hardware context in a timesharing system: scheduling and execution. Graphics contexts are traversed by the rendering processor and those marked are scheduled for execution.

In addition to multitasking, each graphics context provides state and a mechanism to dynamically load that state into the graphics hardware at any time during the execution of graphics commands. In this way, the thread of execution is decoupled from the state needed for execution.

Execution of a graphics context occurs in two phases: loading phase and update phase. During the loading phase the hardware context is brought to a state consistent with the graphics context being loaded. The loading phase for a bitmap graphics context typically sets up drawing state in the hardware context, but rarely performs drawing. The loading phase for a 3-D graphics context typically sets up state in the hardware context, but also draws an image containing a view of a world.

During the update phase, commands are consumed that change the description of a world. The description of a bitmap world is contained in a bitmap data structure so that an update to the description requires editing a bitmap (rasterization).

The description of a 3-D world is contained in a more complex data structure. This data structure is usually traversed during the loading phase so that an update to the description requires editing part of that data structure. In both the 3-D and bitmap case a data structure is edited with the only difference being in the data types and operations used.

The rendering processor 36 loads a bitmap graphics context by executing a list of commands that update the hardware context; this list is referred to as the initialization list. The initialization list is used to obtain consistency of the hardware context before any drawing commands are executed. Each time a graphics context is loaded all the commands in the initialization list are executed, though not consumed. The initialization list is modified either by direct memory access from the host and control processors, or through commands executed by the rendering processor 36. Thus, the client determines the kind and amount of state required for a bitmap graphics context through the use of its initialization list.

A bitmap graphics context presents a processing environment similar to that of general purpose load/store architecture. In this environment each graphics context has a current set of general purpose registers—32 registers in all. The content of the general purpose registers are guaranteed to be consistent throughout the lifetime of the graphics context. In comparison, the hardware context is not guaranteed to remain consistent between one execution of a graphics context and another and as a result the hardware context must be made consistent when a graphics context is loaded.

Normally, a register is used by the rendering processor 36 as explicitly instructed by a command. The rendering processor 36 does, however, require access to some data while it loads and executes a graphics context. This data is implicitly accessed during the execution of a graphics context and is statically assigned to certain registers. The initialization list pointer is an example of data that the rendering processor 36 uses while loading a graphics context and the rendering processor 36 can assume that it will find this pointer in register 2, though register 2 is a general purpose register in all other respects.

TRAVERSAL

Graphics contexts are stored in data structures that are traversed by the structure walker for 3-D and the rendering processor 36 for bitmap. This implies that the rendering processor 36 plays two roles: raster engine and bitmap graphical data structure traverser. All bitmap graphics context data structures are linked to a bitmap data structure root (bitmap root) and all 3-D graphics context data structures are linked to a 3-D data structure root (3-D root). Pointers to both the bitmap and 3-D roots reside in reserved structure memory 26.

Traversal is the term used for the way a class of graphics contexts are selected for execution. A list of graphics contexts is traversed by stepping through the list and visiting each context in a serial fashion. During each visit, it is determined whether or not a graphics context requires execution and if so the context is loaded and executed.

There may be up to three traversals in progress at any given time: low priority 3-D traversal, low priority bitmap traversal, and high priority bitmap traversal, though only one of the three may be executing at any given time. A traversal is either inactive, active, or suspended. A traversal is initially inactive and is activated through use of a signal mechanism. When activated, the first graphics context in the list is visited. A traversal may be suspended when another traversal needs to be activated or resumed. When a suspended traversal is resumed the current graphics context in that traversal is visited. A traversal becomes inactive after all graphics contexts have been visited and no signals to that traversal are pending.

Figure 8:
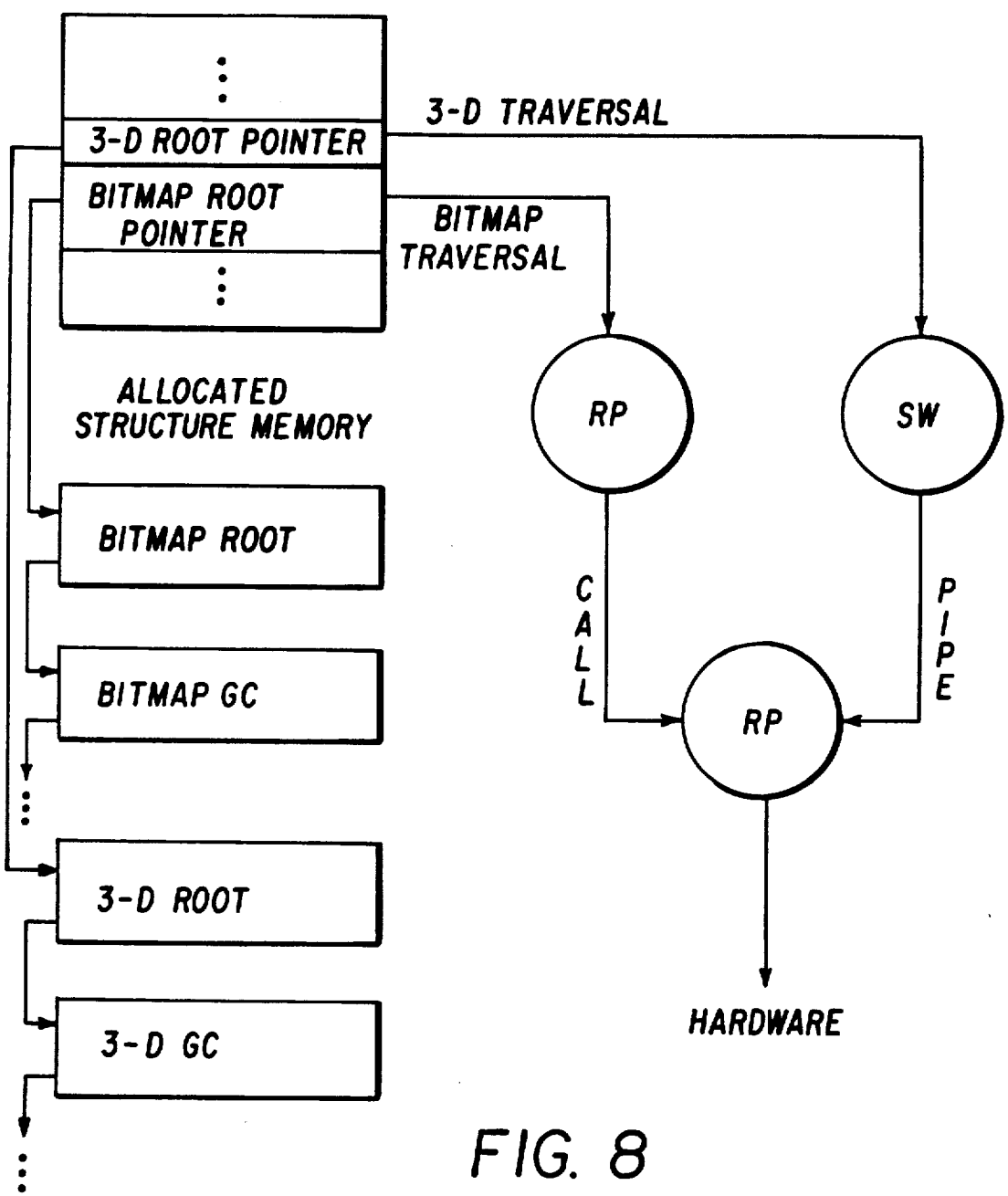
FIG. 8 is a block diagram of the graphics context and traversal model for bitmap graphics processing.

When a graphics context is visited, two bits, local to the graphics context, are used to determine if the graphics context requires execution. The first bit indicates that the graphics context requires execution at low priority. The second bit indicates that the graphics context requires execution at high priority. The traverser checks and clears (interlocked) the appropriate bit(s) as the first step of a visit. These bits are located in the two low order bits of register 1 in a graphics context. Refer to FIG. 8 which illustrates graphics context and traversal model.

A bitmap traversal is signaled to activate through the use of two bits (low priority run bit and high priority run bit) in the bitmap root and through the use of the rendering processor 36 control status register (CSR). It is through the CSR that the host controls the rendering processor 36. To activate a low priority bitmap traversal the low priority run bit is set. This bit is checked and cleared (interlocked) by the rendering processor 36 on a time basis or in response to CSR attention. Signaling for a high priority traversal is done much the same way, though using the high priority run bit in the bitmap root.

A transaction is a series of commands that comprise an operation or program. Commands in a transaction execute synchronously with respect to one another, but may execute asynchronously with commands in other transactions. Multiple transactions execute synchronously within a graphics context, or asynchronously in multiple graphics contexts. A transaction may be terminated explicitly by using the end-transaction command. A bitmap transaction is terminated implicitly when the command queue is exhausted.

A transaction may lock the rendering processor 36 for some period of time, normally to maintain some sort of data consistency. This is accomplished through use of lock and unlocked commands. While the rendering processor 36 is locked the current traversal may not be suspended and the current graphics context continues to execute until an unlock command is encountered.

The rendering processor 36 alternates between executing commands from bitmap graphics contexts and executing commands from 3-D graphics contexts. 3-D commands are taken from the geometry pipeline. In general, low priority 3-D and low priority Bitmap graphics contexts are equal in priority. The following rules are used to establish a scheduling policy that insures fairness between 3-D and bitmap graphics execution.

A bitmap traversal becomes pending whenever either of the run bits in the bitmap root is set.

A pending high priority bitmap traversal is initiated as soon as possible: any time during a 3-D transaction or between any two low priority bitmap transactions.

A high priority bitmap traversal traverses all the bitmap graphics contexts from first to last without interruption.

A pending low priority bitmap traversal is initiated after a 3-D end-of-frame command is received or immediately after the current 3-D transaction terminates following a VSYNC.

A low priority bitmap traversal traverses all the bitmap graphics contexts from first to last, but may be suspended and resumed multiple times. Traversal is suspended and returned to the pending state following VSYNC. During this suspension, execution of pending 3-D transactions is initiated.

A bitmap graphics context becomes pending when either its low or high run bits is set.

A pending high priority bitmap graphics context is executed whenever it is traversed.

A pending low priority bitmap graphics context is executed only when traversed at low priority.

If the number of commands executed in a single visit to a graphics context exceeds a limit specified in the bitmap root, the graphics context is suspended and made pending (rescheduled). Traversal then proceeds to the next graphics context.

Execution of a bitmap graphics context is terminated when the command queue is exhausted.

If the rendering processor 36 is locked by a graphics context all scheduling is deferred until an unlock command is encountered. If the command queue is exhausted, the rendering processor 36 continues to retry the command queue until an unlock command is encountered. On every retry, the rendering processor 36 waits 5 us to avoid bus deadlock.

The following is an example of a scheduling algorithm used by the rendering processor 36. This algorithm implements the scheduling policy set out above.

```
rp_idle_loop( )
    BEGIN
        .
        .
        .
        IF (rp_attention)
            BEGIN
                IF (TestAndClear(resmem.bmroot.status.hi))
                    do_hi_bm_traversal( )
            END
        IF ((rp_attention) OR (vsync_occured)) AND (NOT
        3d_transaction)
            BEGIN
                IF (TestAndClear(resmem.bmroot.status.hi))
                    do_hi_bm_traversal( )
                IF (TestAndClear(resmem.bmroot.status.lo))
                    do_low_bm_traversal( )
            END
        .
        .
        .
    END
do_hi_bm_traversal( )
    BEGIN
        FORALL gc IN resmem.bmroot.gclist
            IF (TestAndClear(gc.status.hi))
                BEGIN
                    load_base_register(gc)
                    FORALL cmd IN gc.iniq execute_command(gc,cmd)
                    FORALL cmd IN gc.exeq consume_command(gc,cmd)
                END
    END
do_low_bm_traversal( )
    BEGIN
        starting_gc = resmem.bmroot.gclist.current;
        FOREVER
            BEGIN
                gc = resmem.bmroot.gclist.current;
                IF (resmem.bmroot.gclist.current.next EQL nil)
                    resmem.bmroot.gclist.current =
                    resmem.bmroot.gclist.first;
                ELSE
                    resmem.bmroot.gclist.current =
                    resmem.bmroot.gclist.current.next;
                IF (TestAndClear(gc.status.lo))
                    BEGIN
                        load_base_register(gc)
                        FORALL cmd IN gc.iniq
                            execute_command(gc,cmd)
                        FORALL cmd IN gc.exeq
                            BEGIN
                                IF (TestAndClear(resmem.bmroot.
                                status.hi))
                                    do_hi_bm_traversal( )
                                consume_command(gc,cmd)
                                IF ((vsynch_occured) OR
                                (reschedule_requested) OR (command_
                                count > resmem.bmroot.command_limit))
                                AND (NOT rp_locked) break;
                            END
                    END
                IF ((NOT resmem.bmroot.status) AND (starting_gc EQL
                resmem.bmroot.gclist.current)) OR
                (vsynch_occured) break;
            END
    END
```

Rescheduling defers the execution of commands in a graphics context until the next traversal. A reschecule requires that both the graphics context run bit and the global run bit be set. After setting these bits traversal proceeds on to the next graphics context.

The rendering processor 36 will maintain a traversal count in the bitmap root. The traversal count is incremented whenever a low priority bitmap traversal is completed. Clients can use this count to determine whether a low priority bitmap traversal has taken place or not. It cannot be used as a guarantee that the rendering processor 36 has serviced a given graphics context, but it can be used to guarantee that the rendering processor 36 is not currently accessing a structure that has been unlinked from access. Thus, a client could use the traversal count to date unlinked packets for future garbage collection.

Figure 9:
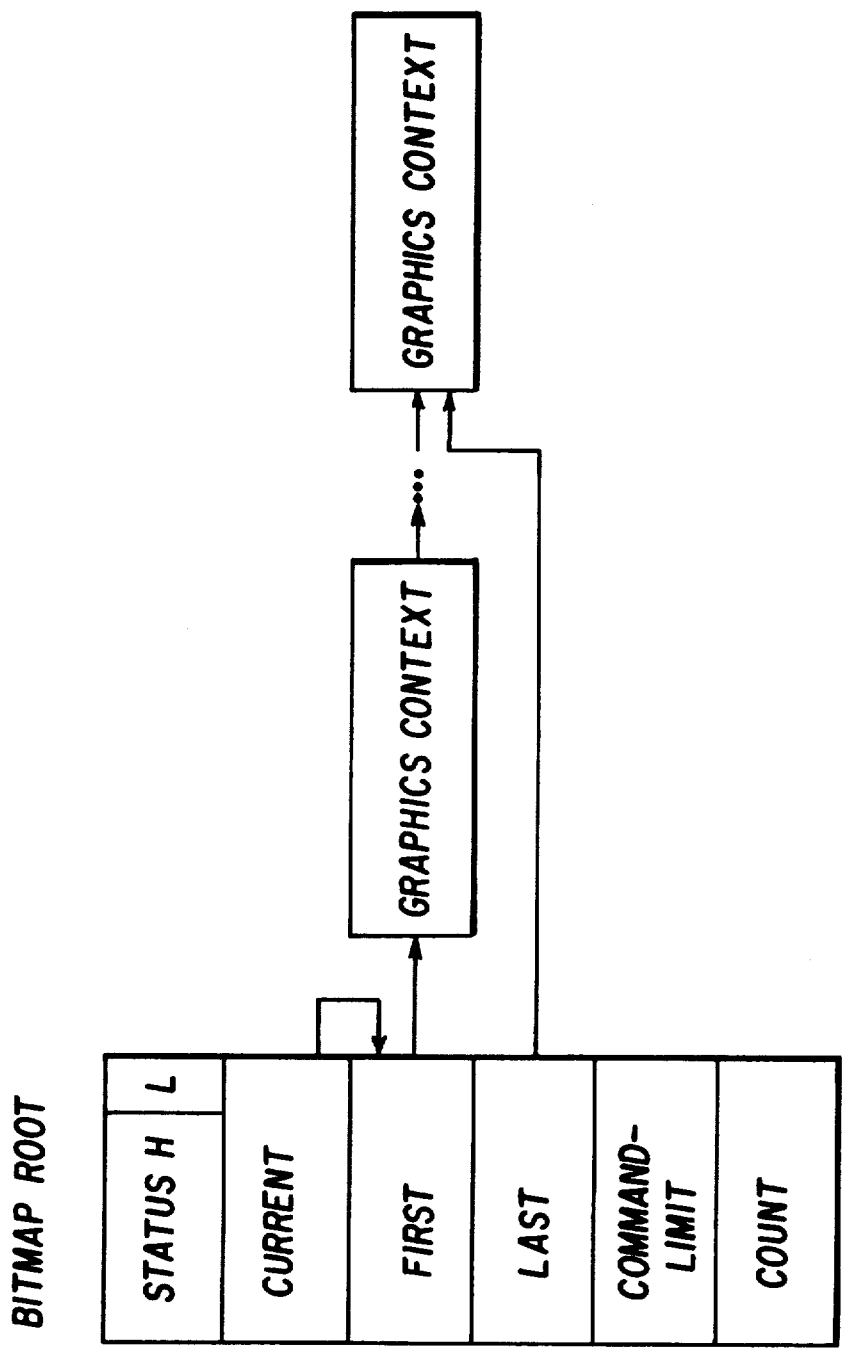
FIG. 9 is a block diagram of the bitmap root.

FIG. 9 illustrates the bitmap root data structure. (Note that traversal is assumed to be in the inactive state.) Listed below are descriptions of the contents of the data structures.

---

Status - 32 bit field that contains bits used
for bitmap traversal. The table below contains
definitions for bits in this field.
| Bit | Description |
| --- | --- |
| 0 | Low Priority Run Bit |
| 1 | High Priority Run Bit |
| 2-31 | Reserved and zeroed |

Current - a pointer to the previously executed low
priority bitmap graphics context. When low
priority bitmap traversal is inactive it points to First.
First - a pointer to the first bitmap graphics context.
Last - a pointer to the last bitmap graphics context.
Command-Limit - an unsigned integer which specifies
the maximum number of commands that may be executed
in a graphics context during any given scheduling cycle.
Count - an unsigned integer count of the low priority
bitmap traversals that have taken place.

---

Figure 10:
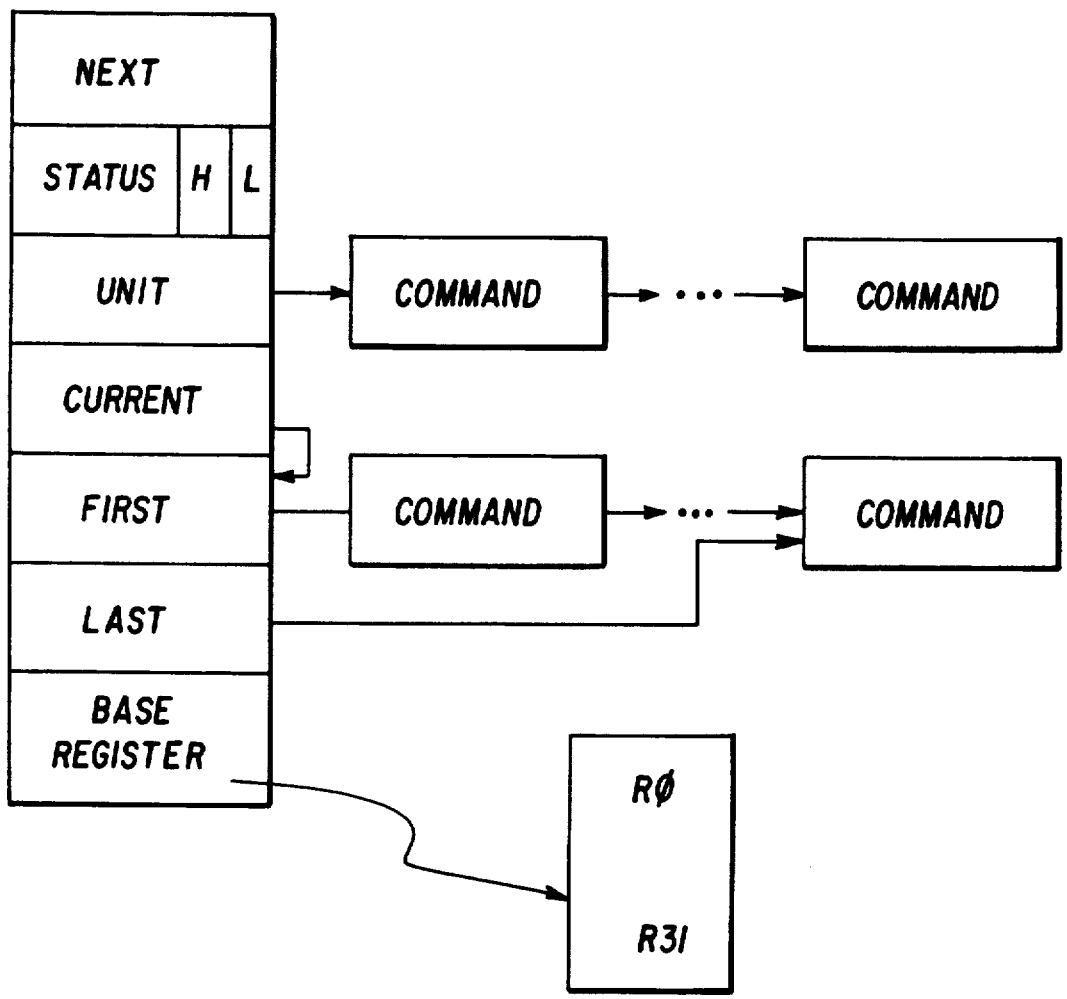
FIG. 10 is a block diagram of the bitmap graphics context.

The bitmap graphics context is a data structure. FIG. 10 illustrates the bitmap graphics context data structure. (Note that none of the commands in the command queue depicted have been executed.)

---

Next - A pointer to the next bitmap graphics context.
Status - A bit field that contains bits used for bitmap
traversal. The table below contains definitions for
each of the bits in this field.
| Bit | Description |
| --- | --- |
| 0 | Low Priority Run Bit |
| 1 | High Priority Run Bit |
| 2-31 | reserved - and zeroed |

Init - A pointer to a list of commands that make up the
initialization list.
Current - A pointer to the previously executed bitmap
graphics command. When low priority bitmap traversal
is inactive it points to First.
First - A pointer to the first bitmap graphics command.
Last - A pointer to the last bitmap graphics command.
Base register is a pointer to 32 general purpose registers.

---

Bitmap data format pertains to how bitmap data is organized in memory. There are multiple ways that a bitmap may be organized in memory. The rendering processor 36 microcode manages four formats:
Cell Array
Planar
Unpacked Byte
Unpacked Longword In cell array format a 2×4×4 array of pixel data is contained in a longword: 2 bits from 16 pixels, 4 rows of 4 pixels. Adjacent longwords contain cells adjacent in the X dimension. FIG. 11 illustrates how bits in a cell correspond to bits in a longword.

The following describes the convention used to describe bit storage:

| | |
|---|---|
| Longword | 32 bits |
| Word | 16 bits |
| byte | 8 bits |

Planar format is most commonly used in existing DEC workstations. In planar format one bit from 32 pixels (the same bit in each pixel) is stored in a longword. Bits 0–31 are from adjacent pixels that run from left to right in the bitmap. Bits from consecutive pixels on a scanline (left to right) are contained in consecutive longwords of memory. The memory used to store a scanline of pixels is longword padded. Adjacent planes of scanlines are stored in adjacent memory regions. This deviates from the standard planar bitmap; data in scanlines are normally word padded. When data is copied from system memory to structure memory or from structure memory to system memory the host must compensate for this difference. Structure memory is byte addressable from the host, but only longword addressable by the rendering processor 36.

In unpacked byte format a bitmap contains pixels that are 8 or fewer bits deep and each pixel is contained, aligned to bit zero, in a byte of memory; a byte contains exactly one pixel. Consecutive pixels on a scanline (left to right) are contained in consecutive bytes of memory. The memory used to store a scanline of pixels is longword padded.

In unpacked longword format, a bitmap contains pixels that are 32 or fewer bits deep and each pixel is contained, aligned to bit zero, in a longword of memory; a longword contains exactly one pixel. Consecutive pixels on a scanline (left to right) are contained in consecutive longwords of memory.

A pitch is a value that specifies the relative memory location of data for pixels that are geometrically adjacent. Pixel data may be adjacent in X, Y, or Z. Pixel data adjacent in X is stored in adjacent memory locations, but pixel data adjacent in the other dimensions are in remote memory locations by the amount specified by either the Y-pitch or Z-pitch. Pitch values may be calculated from bitmap dimensions and format. Pitch values are normally an artifact in the implementation of a particular command. For the system of invention, a pitch is often calculated by host software and used by the rendering processor 36 to execute a lower level command. This frees the rendering processor 36 from having knowledge of complicated bitmap data structures.

In all bitmap formats, except cell array, the Y-pitch specifies how to move from one scanline to the next. In planar format the Z-pitch specifies how to move from one plane to the next. For cell array format the Y-pitch specifies how to move from one scanline of cells (four scan lines of the bitmap) to the next and the Z-pitch specifies how to move from one plane of cells (two planes of the bitmap) to the next.

Figure 12:
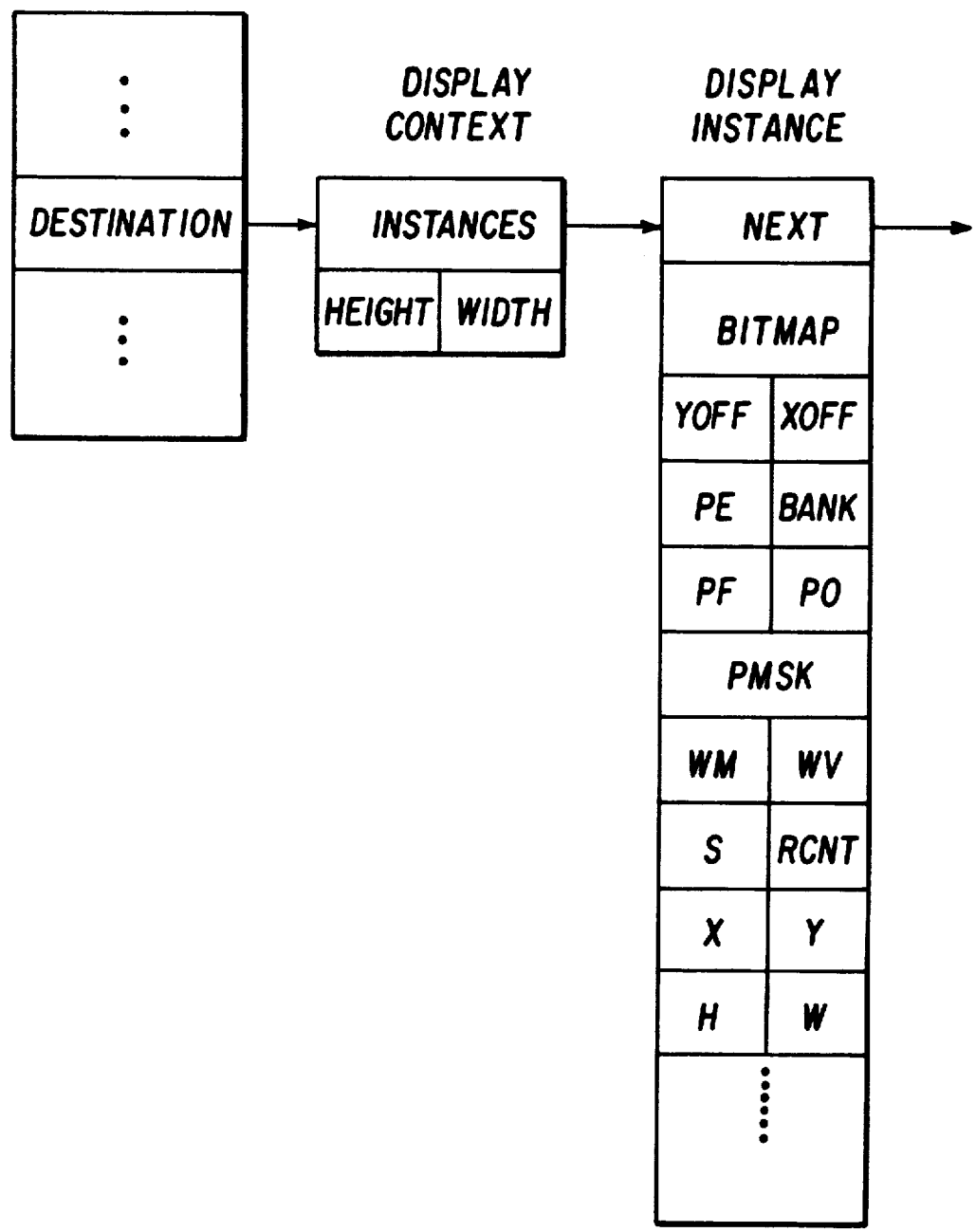
FIG. 12 is a block diagram of the bitmap display context.

A display context defines how a rectangular region, display region, is projected upon one or more bitmaps. Each time a display region appears in a bitmap is considered to be a display instance. A display instance specifies the bitmap in which the display region appears, the offset of the display region in the bitmap, how the display region is clipped (rectangles and/or window planes), and what pixel format is used. The display context data structure is illustrated in FIG. 12 and described below.

---

Destination Data Structure

INSTANCES - a longword that contains the address of the display instance list. A value of 0 (Null value) implies that the display context does not currently appear in any bitmap.
WIDTH - a word that contains the width of the display region.
HEIGHT - a word that contains the height of the display region.

Destination Instance Data Structure

NEXT - a longword that contains the address of the next display instance. An address of 0 (Null value) indicates the end of the display instance list.
BITMAP - a longword that contains the address of a bitmap descriptor. A zero value implies the frame buffer bitmap and is the only value the rendering processor 36 will accept. If a non-zero value is detected the rendering processor 36 ignores the destination instance.
XOFF - a word that contains the x offset of the display region from the origin of the bitmap.
YOFF - a word that contains the y offset of the display region from the origin of the bitmap.
BANK - a bit field that specifies what frame buffer banks the display instance is displayed in.

| Bit | Description |
|---|---|
| 0 | Bank A enable |
| 1 | Bank B enable |
| 2-15 | reserved and zeroed |

ZE - an unsigned word that contains the pixel extent of the display pixel. Currently, this value is restricted to be a multiple of 4 or 8.
ZO - a signed word that contains the pixel offset of the display pixel in the bitmap pixel. Currently, this value is restricted to be a multiple of 4 for displays with extents of 4 and a multiple of 8 for display of extents of 8.
ZF - an unsigned word that contains the display pixel format. Currently, a value of 0 specifies mapped color format and a value of 1 specifies full color format.
PMSK - a longword that contains a bit field used to mask display pixel data as it's written.
WV - an unsigned word that contains the hardware window number used to mask drawing operations.
WM - an unsigned word that contains the hardware window mask that indicates what bits in the window number are used.
RCOUNT - a word that contains the number of clipping rectangles in the display instance.
RECTS - an array of rectangle data structures, as defined below, that are used to clip drawing operations for this display instance. Each rectangle is relative to the origin of the display region. A rectangle specifies where drawing is to be performed. An empty rectangle list specifies that no drawing is to be performed.

Rectangle Data Structure

X - a word that specifies the x offset of the upper left corner of a clipping rectangle.
Y - a word that specifies the y offset of the upper left corner of a clipping rectangle.
W - a word that specifies the width of a clipping retangle.
H - a word that specifies the height of a clipping rectangle.

---

The above described preferred embodiment of the invention is meant to be representative only, as certain changes may be made therein without departing from the clear teachings of the invention. Accordingly, reference should be made to the following claims which alone define the invention.

What is claimed is:

1. A method of operating a computer system comprising a first central processing unit providing a plurality of process virtual address spaces and a system virtual address space, a primary bus having a reserved I/O address space with a starting and ending address, a control processor having mapping registers, the control processor coupled by the primary bus to the first central processing unit, and local memory connected to the local control processor by a local bus, comprising the steps of:

a) operating the first central processing unit to transfer the starting and ending addresses of the reserved I/O space to the mapping registers;

b) operating the first central processing unit to relocate the local memory to be within the starting and ending addresses of the reserved I/O space;

c) operating the first central processing unit to map the local memory of the control processor into the system virtual address space;

d) operating the first central processing unit to provide a separate one or more of the process virtual address spaces to each of a plurality of processes;

e) operating the first central processing unit to enable the plurality of processes to access the portion of the system virtual address space to which the local memory is mapped such that each of the plurality of processes addresses the local memory by directly addressing the system virtual address space in which the local memory is mapped; and f) one or more of the plurality of processes writing data representative of displayable graphics to the local memory.

2. The method according to claim 1, further comprising the step of preventing the plurality of processes from directly referencing physical addresses.

3. A computer system which comprises:

a first central processing unit having a plurality of process virtual address spaces and a system virtual address space;

a control processor;

local memory, contained within a computer graphics subsystem;

a local bus coupling the control processor to the local memory;

a primary bus coupling the first central processing unit to the control processor;

a reserved I/O address space having starting and ending addresses on the primary bus; and mapping registers associated with the at least one local control processor for storing the starting and ending addresses of the reserved I/O space.

4. The computer system according to claim 3, wherein the first central processing unit prevents processes from directly referencing physical addresses.

* * * * *